US012803153B2

(12) United States Patent
Bisiules et al.

(10) Patent No.: US 12,803,153 B2
(45) Date of Patent: Nov. 17, 2026

(54) SMALL CELL ANTENNAS SUITABLE FOR MIMO OPERATION

(71) Applicant: Outdoor Wireless Networks LLC, Claremont, NC (US)

(72) Inventors: Peter J. Bisiules, LaGrange Park, IL (US); Jonathon C. Veihl, New Lenox, IL (US); Xiangyang Ai, Plano, TX (US); Martin L. Zimmerman, Chicago, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 120 days.

(21) Appl. No.: 18/925,609

(22) Filed: Oct. 24, 2024

(65) Prior Publication Data

US 2025/0055177 A1 Feb. 13, 2025

Related U.S. Application Data

(63) Continuation of application No. 17/239,737, filed on Apr. 26, 2021, now Pat. No. 12,160,030, which is a (Continued)

(51) Int. Cl.
*H01Q 1/24* (2006.01)
*H01Q 21/26* (2006.01)
(Continued)

(52) U.S. Cl.
CPC ............. *H01Q 1/246* (2013.01); *H01Q 21/26* (2013.01); *H04B 7/2606* (2013.01);
(Continued)

(58) Field of Classification Search
CPC .......... H01Q 1/246; H01Q 5/50; H01Q 21/28; H01Q 25/005
See application file for complete search history.

(56) References Cited

U.S. PATENT DOCUMENTS

| | | | |
|---|---|---|---|
| 4,980,692 | A | 12/1990 | Rudish et al. |
| 5,686,926 | A | 11/1997 | Kijima et al. |

(Continued)

FOREIGN PATENT DOCUMENTS

| | | | |
|---|---|---|---|
| AU | 2013260675 | A1 | 6/2014 |
| CN | 2729936 | Y | 9/2005 |

(Continued)

OTHER PUBLICATIONS

S.M. Kaplan, Wiley Electrical and Electronics Engineering Dictionary, John Wiley & Sons, Inc., p. 591 (Year: 2004).*

(Continued)

*Primary Examiner* — Bernarr E Gregory
*Assistant Examiner* — Fred H Mull
(74) *Attorney, Agent, or Firm* — Myers Bigel, P.A.

(57) ABSTRACT

A base station antenna includes a first set of radiating elements that are configured to generate a first antenna beam that has a first peanut-shaped antenna pattern in an azimuth plane and a second set of radiating elements that are configured to generate a second antenna beam that has a second peanut-shaped antenna pattern in the azimuth plane. A longitudinal axis of the first peanut-shaped antenna pattern in the azimuth plane is rotated approximately ninety degrees from a longitudinal axis of the second peanut-shaped antenna pattern in the azimuth plane.

15 Claims, 26 Drawing Sheets

Related U.S. Application Data continuation of application No. 15/875,555, filed on Jan. 19, 2018, now Pat. No. 11,018,416.

(60) Provisional application No. 62/486,897, filed on Apr. 18, 2017, provisional application No. 62/455,954, filed on Feb. 7, 2017, provisional application No. 62/454,429, filed on Feb. 3, 2017.

(51) Int. Cl.
*H04B 7/26* (2006.01)
*H04W 72/00* (2023.01)
*H04W 88/00* (2009.01)
*H04B 7/06* (2006.01)

(52) U.S. Cl.
CPC ........... *H04W 72/00* (2013.01); *H04W 88/00* (2013.01); *H04B 7/0617* (2013.01)

(56) References Cited

U.S. PATENT DOCUMENTS

| | | | |
|---|---|---|---|
| 5,771,017 A | 6/1998 | Dean et al. | |
| 6,549,242 B1 * | 4/2003 | Plonka | H04L 1/0041 348/E7.039 |
| 7,068,222 B2 | 6/2006 | Koparan et al. | |
| 7,167,136 B2 | 1/2007 | Thudor et al. | |
| 8,548,525 B2 | 10/2013 | Wong et al. | |
| 9,722,326 B2 | 8/2017 | Chistyakov et al. | |
| 9,917,375 B2 | 3/2018 | Korva et al. | |
| 10,164,346 B2 | 12/2018 | Ming et al. | |
| 10,193,236 B1 | 1/2019 | Lee et al. | |
| 10,530,440 B2 | 1/2020 | Bisiules et al. | |
| 2004/0066345 A1 | 4/2004 | Schadler | |
| 2004/0160374 A1 | 8/2004 | Johansson et al. | |
| 2004/0202292 A1 * | 10/2004 | Cook | G01S 5/0027 342/357.31 |
| 2004/0263392 A1 | 12/2004 | Bisiules et al. | |
| 2005/0012665 A1 | 1/2005 | Runyon et al. | |
| 2006/0244675 A1 | 11/2006 | Elliot et al. | |
| 2008/0079647 A1 | 4/2008 | Schadler et al. | |
| 2008/0200116 A1 | 8/2008 | Raffaelli et al. | |
| 2009/0034448 A1 | 2/2009 | Miller et al. | |
| 2009/0146903 A1 | 6/2009 | Ownbey et al. | |
| 2010/0066637 A1 | 3/2010 | Schadler et al. | |
| 2010/0117913 A1 | 5/2010 | Jung | |
| 2010/0119002 A1 | 5/2010 | Hartenstein | |
| 2010/0290552 A1 | 11/2010 | Sasaki | |
| 2011/0006957 A1 | 1/2011 | Scire-scappuzzo et al. | |
| 2011/0134008 A1 | 6/2011 | Schadler et al. | |
| 2011/0205119 A1 | 8/2011 | Timofeev et al. | |
| 2012/0038530 A1 | 2/2012 | Chen et al. | |
| 2012/0077504 A1 | 3/2012 | Schadler et al. | |
| 2012/0280879 A1 | 11/2012 | Zimmerman et al. | |
| 2013/0017837 A1 * | 1/2013 | Hakola | H04W 16/14 455/454 |
| 2013/0088404 A1 | 4/2013 | Ramachandran et al. | |
| 2014/0035792 A1 | 2/2014 | Schadler et al. | |
| 2014/0375518 A1 | 12/2014 | Powell et al. | |
| 2015/0091767 A1 | 4/2015 | Matitsine et al. | |
| 2015/0156642 A1 | 6/2015 | Sobczak et al. | |
| 2015/0195001 A1 | 7/2015 | Barker et al. | |
| 2015/0256213 A1 | 9/2015 | Jan et al. | |
| 2015/0295313 A1 | 10/2015 | Zimmerman et al. | |
| 2015/0303585 A1 | 10/2015 | Chistyakov et al. | |
| 2016/0285174 A1 | 9/2016 | Chistyakov et al. | |
| 2017/0013518 A1 * | 1/2017 | Kilgour | H04W 36/0066 |
| 2017/0085289 A1 | 3/2017 | Jan et al. | |
| 2017/0194718 A1 | 7/2017 | Honda | |
| 2018/0227775 A1 | 8/2018 | Bisiules et al. | |
| 2018/0367209 A1 | 12/2018 | Jamaly | |

FOREIGN PATENT DOCUMENTS

| | | | | |
|---|---|---|---|---|
| CN | 101218762 A | 7/2008 | | |
| CN | 101689710 A | 3/2010 | | |
| CN | 201956464 U | 8/2011 | | |
| CN | 102882014 A | 1/2013 | | |
| CN | 205406737 U | 7/2016 | | |
| CN | 106099342 A | 11/2016 | | |
| CN | 206180123 U | 5/2017 | | |
| DE | 102005003685 A1 | 8/2006 | | |
| EP | 0512487 A1 | 11/1992 | | |
| EP | 2894712 A1 | 7/2015 | | |
| JP | 2006501726 A | 1/2006 | | |
| TW | I544829 B | * | 8/2016 | H01Q 21/205 |
| WO | 2015029946 A1 | 3/2015 | | |
| WO | 2015154809 A1 | 10/2015 | | |

OTHER PUBLICATIONS

F.B. Gross, Smart Antennas for Wireless Communication, McGraw-Hill Professional Publishing, p. 65-104 (Year: 2005).*
"Datasheet for SBA Smart Omni, Long, 2.3-2.4 GHz, Airspan P/Ns: Tilt 0°: SBAL-—2.3-DUAL-1", Airspan Networks Inc., Nov. 2015.
"Bernhard Schulz, "LTE Transmission Modes and Beamforming", White Paper, Rohde & Schwarz, Jul. 2015".
"Chuck Powell, "Technical Analysis: Beamforming vs. MIMO Antennas", White Paper, Radio Frequency Systems, Mar. 2014".
"Communication Pursuant to Article 94(3) EPC, corresponding to European Patent Application No. 18747469.7-1205, mailing date Aug. 30, 2022, 11 pages".
"Communication Pursuant to Article 94(3) EPC, corresponding to European Patent Application No. 18835057.3-1205, mailing date Mar. 24, 2022, 4 pages".
"English Translation of DE 102005003685 A1 (Year: 2020)".
"English Translation of Office Action for corresponding Chinese Application No. 201880055356.1, mailing date Nov. 4, 2020, 9 pages".
"EP Search Report Corresponding to EP Application No. 18747469.7 dated Oct. 22, 2020".
"European Search Report in Corresponding Patent Application No. 15150390.1, mailed Dec. 19, 2022, 19 pages".
"Notification Concerning Transmittal of International Preliminary Report on Patentability in corresponding PCT Application No. PCT/US2018/014380 (Aug. 15, 2019)".
"Notification of Transmittal of the International Search Report and the Written Opinion of the International Searching Authority, or the Declaration, corresponding International Application PCT/US18/14380, mailing date: May 1, 2018, 13 pp.".
"Notification of Transmittal of the International Search Report and the Written Opinion of the International Searching Authority, or the Declaration, corresponding to International Application No. PCT/US2018/042267, date of mailing: Oct. 1, 2018".
"Supplementary European Search Report for corresponding European Patent Application No. EP 18 83 5057, dated Feb. 17, 2021, 11 pgs".
"U.S. Appl. No. 15/679,450, filed Aug. 17, 2017; Inventor: Martin L. Zimmerman; Entitled: Small Cell Beam-Forming Antennas".

* cited by examiner

SMALL CELL ANTENNAS SUITABLE FOR MIMO OPERATION

CROSS-REFERENCE TO RELATED APPLICATIONS

The present application is a continuation application under, and claims priority to, 35 U.S.C. § 120 of U.S. patent application Ser. No. 17/239,737, filed Apr. 26, 2021, now U.S. Pat. No. 12,160,030, which in turn is a continuation of U.S. patent application Ser. No. 15/875,555, filed Jan. 19, 2018, now U.S. Pat. No. 11,018,416, which in turn claims priority under 35 U.S.C. § 119 to U.S. Provisional Patent Application Ser. No. 62/454,429, filed Feb. 3, 2017, to U.S. Provisional Patent Application Ser. No. 62/455,954, filed Feb. 7, 2017, and to U.S. Provisional Patent Application Ser. No. 62/486,897, filed Apr. 18, 2017, the entire content of each of which is incorporated herein by reference as if set forth in its entirety.

FIELD

The present invention relates to cellular communications systems and, more particularly, to base station antennas for small cell cellular base stations.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors," and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed spectrum that has a much smaller range than a typical "macro cell" base station. A small cell base station may be designed to serve users who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macro cell.

SUMMARY

Pursuant to embodiments of the present invention, base station antennas are provided that include a first linear array of radiating elements that are mounted in front of a first backplane; a second linear array of radiating elements that are mounted in front of a second backplane; a third linear array of radiating elements that are mounted in front of a third backplane; a fourth linear array of radiating elements that are mounted in front of a fourth backplane; a first feed network that is coupled to the first and third linear arrays of radiating elements; and a second feed network that is coupled to the second and fourth linear arrays of radiating elements. The first linear array of radiating elements is positioned generally opposite the third linear array of radiating elements, and the second linear array of radiating elements is positioned generally opposite the fourth linear array of radiating elements.

In some embodiments, the first through fourth backplanes may together define a tube. In some embodiments, the tube may have a generally rectangular cross-section.

In some embodiments, the first feed network may feed the radiating elements of the first linear array of radiating elements out-of-phase with respect to the radiating elements of the third linear array of radiating elements.

In some embodiments, the first and third linear arrays of radiating elements may be configured to generate a first antenna beam that has a peanut-shaped cross-section in the azimuth plane, and the second and fourth linear arrays of radiating elements may be configured to generate a second antenna beam that has a peanut-shaped cross-section in the azimuth plane. In such embodiments the first and second antenna beams may together provide omnidirectional coverage in the azimuth plane.

In some embodiments, each radiating element may comprise a cross-polarized radiating element that has a first radiator that is configured to transmit and receive RF signals at a first polarization and a second radiator that is configured to transmit and receive RF signals at a second polarization that is orthogonal to the first polarization, and the base station antenna may further include a third feed network that is coupled to the first and third linear arrays of radiating elements and a fourth feed network that is coupled to the second and fourth linear arrays of radiating elements. The first and second feed networks may be connected to the first radiators and the third and fourth feed networks may be connected to the second radiators. In such embodiments, the first and third linear arrays of radiating elements may be configured to generate a first antenna beam at a first polarization and a second antenna beam at a second polarization that is opposite the first polarization, and the second and fourth linear arrays of radiating elements may be configured to generate a third antenna beam at the first polarization and a fourth antenna beam at the second polarization. In these embodiments, the first and third linear arrays of radiating elements may be configured to operate as a two-input-two-output MIMO antenna and the second and fourth linear arrays of radiating elements may be configured to operate as a two-input-two-output MIMO antenna.

In some embodiments, the base station antenna may further include a fifth linear array of radiating elements that are mounted in front of the first backplane; a sixth linear array of radiating elements that are mounted in front of the third backplane; and a third feed network that is coupled to the fifth and sixth linear arrays of radiating elements. The first through fourth linear arrays of radiating elements may be configured to transmit and receive RF signals in a first frequency band and the fifth and sixth linear arrays of radiating elements may be configured to transmit and receive RF signals in a second frequency band that is different than the first frequency band. In some embodiments, the base station antenna may further include a seventh linear array of radiating elements that are mounted in front of the second backplane; an eighth linear array of radiating elements that are mounted in front of the fourth backplane; and a fourth feed network that is coupled to the seventh and eighth linear arrays of radiating elements, and the seventh and eighth linear arrays of radiating elements may be configured to transmit and receive RF signals in the second frequency band. In other embodiments, the second and fourth backplanes may not include linear arrays of radiating elements that are configured to transmit and receive signals in the second frequency band.

Pursuant to further embodiments of the present invention, base station antennas are provided that include a first set of radiating elements that are configured to generate a first antenna beam that covers a first sector in an azimuth plane and a third sector in the azimuth plane and a second set of radiating elements that are configured to generate a second antenna beam that covers a second sector in the azimuth plane and a fourth sector in the azimuth plane, where the second sector is between the first sector and the third sector.

In some embodiments, the fourth sector may be between the first sector and the third sector and may be opposite the second sector.

In some embodiments, the first set of radiating elements may comprise a first subset of radiating elements that are arranged as a first linear array of radiating elements and a third subset of radiating elements that are arranged as a third linear array of radiating elements, and the third linear array of radiating elements may be mounted opposite the first linear array of radiating elements.

In some embodiments, the second set of radiating elements may comprise a second subset of radiating elements that are arranged as a second linear array of radiating elements and a fourth subset of radiating elements that are arranged as a fourth linear array of radiating elements, where the fourth linear array of radiating elements is mounted opposite the second linear array of radiating elements. In such embodiments the first linear array of radiating elements may point in a direction opposite a pointing direction of the third linear array of radiating elements.

In some embodiments, the first through fourth linear arrays of radiating elements may be mounted on respective first through fourth major surfaces of a tubular reflector assembly. The tubular reflector assembly may have, for example, a rectangular cross-section in the azimuth plane.

In some embodiments, the first and second antenna beams may each have a peanut-shaped cross-section in the azimuth plane.

In some embodiments, the base station antenna may further include a first feed network that is coupled to the first and third linear arrays of radiating elements and a second feed network that is coupled to the second and fourth linear arrays of radiating elements.

In some embodiments, the first and second antenna beams may together provide omnidirectional coverage in the azimuth plane.

In some embodiments, the base station antenna may further include a feed network that feeds the first subset of radiating elements out-of-phase with respect to third subset of radiating elements.

Pursuant to further embodiments of the present invention, base station antennas are provided that include a first set of radiating elements that is configured to generate a first antenna beam that has a first peanut-shaped cross-section in an azimuth plane and a second set of radiating elements that is configured to generate a second antenna beam that has a second peanut-shaped cross-section in the azimuth plane, where a longitudinal axis of the first antenna beam in the azimuth plane is rotated approximately ninety degrees from a longitudinal axis of the second antenna beam in the azimuth plane.

In some embodiments, the first set of radiating elements may comprise a first subset of radiating elements that are arranged as a first linear array of radiating elements and a third subset of radiating elements that are arranged as a third linear array of radiating elements. The second set of radiating elements may comprise a second subset of radiating elements that are arranged as a second linear array of radiating elements and a fourth subset of radiating elements that are arranged as a fourth linear array of radiating elements.

In some embodiments, the third linear array of radiating elements may be mounted opposite the first linear array of radiating elements and the fourth linear array of radiating elements may be mounted opposite the second linear array of radiating elements.

In some embodiments, the first through fourth linear arrays of radiating elements may be mounted on respective first through fourth major surfaces of a tubular reflector assembly. In some embodiments, the tubular reflector assembly may have a rectangular cross-section in the azimuth plane.

In some embodiments, the base station antenna may further include a first feed network that is coupled to the first and third linear arrays of radiating elements and a second feed network that is coupled to the second and fourth linear arrays of radiating elements.

In some embodiments, the first and second antenna beams may together provide omnidirectional coverage in the azimuth plane.

Pursuant to yet further embodiments of the present invention, base station antennas are provided that include a first set of radiating elements that are arranged as a first linear array of radiating elements; a second set of radiating elements that are arranged as a second linear array of radiating elements, the second linear array mounted opposite the first linear array and pointing in a different direction than the first linear array; and a feed network that couples the first and second sets of radiating elements to a radio, wherein the feed network is configured to feed the first set of radiating elements out-of-phase with respect to the second set of radiating elements.

In some embodiments, the first linear array may point in a first direction in the azimuth plane and the second linear array may point in a second direction in the azimuth plane that is rotated in the azimuth plane by approximately 180 degrees from the first direction.

In some embodiments, the first set of radiating elements may be fed approximately 180 degrees out-of-phase with respect to the second set of radiating elements.

In some embodiments, the first set of radiating elements may be fed out-of-phase with respect to the second set of radiating elements by between 135 degrees and 225 degrees.

In some embodiments, the first and second sets of radiating elements may be configured to operate in a frequency band that is within a frequency range of between 600 MHz and 1 GHz.

In some embodiments, the first and second sets of radiating elements may each include two radiating elements.

In some embodiments, each radiating element in the first and second sets of radiating elements may be a dual-polarized radiating element that includes a first radiator that is configured to transmit and receive RF signals having a first polarization and a second radiator that is configured to transmit and receive RF signals having a second polarization that is opposite the first polarization, and the feed network may be a first feed network and the radio is a first radio and the first feed network may couple the first radiators of the first and second sets of radiating elements to the first radio. In such embodiments, the base station antenna may further include a second feed network that couples the second radiators of the first and second sets of radiating elements to a second radio, wherein the second feed network is configured to feed the second radiators of the first set of radiating elements out-of-phase with respect to the second radiators of the second set of radiating elements.

In some embodiments, the first and second linear arrays may be configured to generate a first antenna beam that has a peanut-shaped cross-section in an azimuth plane.

Pursuant to additional embodiments of the present invention, base station antennas are provided that include a first group of radiating elements that are mounted in front of a first backplane and a second group of radiating elements that are mounted in front of a second backplane, where the first and second backplanes face different directions, and the first and second groups of radiating elements are coupled to a first port of a radio via a first feed network.

In some embodiments, the base station antenna may further include a third group of radiating elements that are mounted in front of a third backplane and a fourth group of radiating elements that are mounted in front of a fourth backplane, and the third and fourth backplanes may face in different directions, and may be coupled to a second port of a radio via a second feed network.

In some embodiments, each of the first, second, third and fourth groups of radiating elements may include a single radiating element.

In some embodiments, the first group of radiating elements may be positioned generally opposite the second group of radiating elements.

In some embodiments, the third group of radiating elements may be positioned generally opposite the fourth group of radiating elements, and the first through fourth backplanes may define a rectangular tube.

In some embodiments, the third and fourth groups of radiating elements may be vertically separated from the first and second groups of radiating elements.

In some embodiments, the first and second groups of radiating elements may be configured to generate a first antenna beam that has a first peanut-shaped cross-section in the azimuth plane.

In some embodiments, the base station antenna may further include a third group of radiating elements that are mounted in front of the first backplane and a fourth group of radiating elements that are mounted in front of the second backplane, and the third and fourth groups of radiating elements may be coupled to a second port of a radio via a second feed network, and the third and fourth groups of radiating elements may be configured to generate a second antenna beam that has a second peanut-shaped cross-section in the azimuth plane.

In some embodiments, the first and second groups of radiating elements may comprise respective first and second groups of low band radiating elements, and the base station antenna may further include a first linear array of high band radiating elements that are mounted in front of a first backplane; a second linear array of high band radiating elements that are mounted in front of a second backplane; a third linear array of high band radiating elements that are mounted in front of a third backplane; a fourth linear array of high band radiating elements that are mounted in front of a fourth backplane; a first feed network that is coupled to the first and third linear arrays of high band radiating elements; and a second feed network that is coupled to the second and fourth linear arrays of high band radiating elements.

In some embodiments, the first through fourth backplanes may together define a rectangular tube.

In some embodiments, the first and third linear arrays of high band radiating elements may be configured to generate a first antenna beam that has a peanut-shaped cross-section in the azimuth plane, and the second and fourth linear arrays of high band radiating elements may be configured to generate a second antenna beam that has a peanut-shaped cross-section in the azimuth plane.

DETAILED DESCRIPTION

Figure 1A:
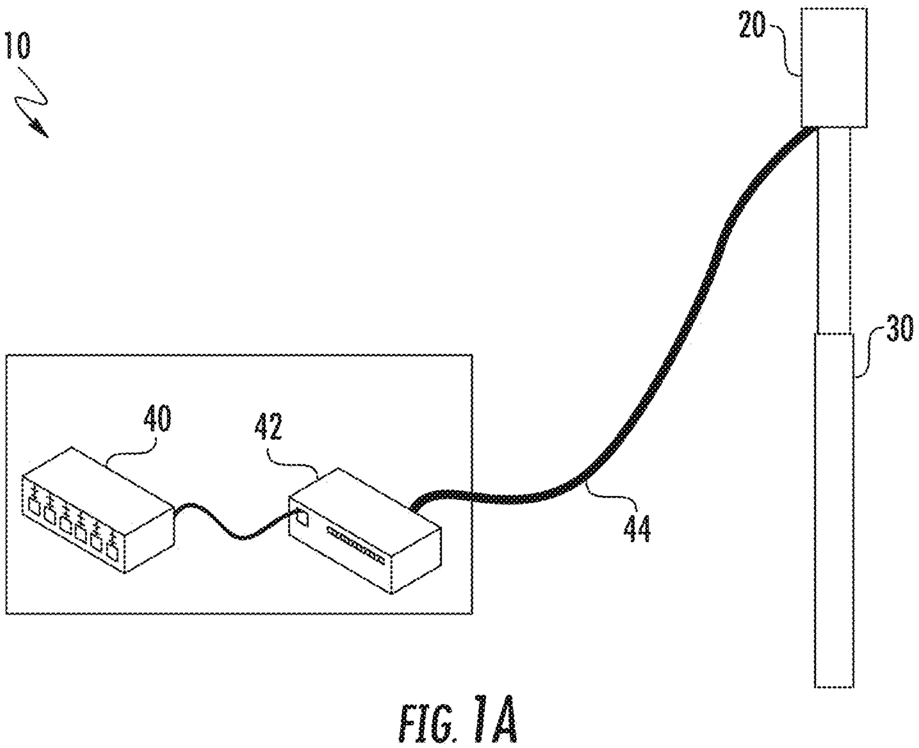
FIG. 1A is a highly simplified schematic diagram illustrating a small cell cellular base station.

Pursuant to embodiments of the present invention, small cell antenna are provided that may support MIMO operation that may be simpler and less expensive than conventional small cell antennas. In some embodiments, the small cell antenna may include four linear arrays of radiating elements that are mounted on the four main faces of a rectangular tubular reflector assembly. The first and third linear arrays may be mounted on opposed main faces of the rectangular tubular reflector assembly and may be commonly fed to generate a first antenna beam that has a peanut shaped cross-section in the azimuth plane. The second and fourth linear arrays may be mounted on the other two opposed main faces of the rectangular tubular reflector assembly and may be commonly fed to generate a second antenna beam that also has a peanut shaped cross-section in the azimuth plane. The second antenna pattern may have substantially the same shape as the first antenna pattern and may be rotated approximately ninety degrees with respect to the first antenna pattern in the azimuth plane. Together, the peanut-shaped first and second antenna beams may form a suitable omnidirectional antenna beam in the azimuth plane.

In some embodiments, the radiating elements in the first through fourth linear arrays may comprise dual-polarized radiating elements such as, for example, slant −45°/+45° cross-dipole radiating elements. When dual-polarized radiating elements are used, a first port on the radio may be used to commonly feed radiators having a first polarization that are included in the radiating elements of the first and third linear arrays, and a second port on the radio may be used to commonly feed radiators having a second polarization that are included in the radiating elements of the first and third linear arrays. Similarly, a third port on the radio may be used to commonly feed radiators having the first polarization that are included in the radiating elements of the second and fourth linear arrays, and a fourth port on the radio may be used to commonly feed radiators having the second polarization that are included in the radiating elements of the second and fourth linear arrays. The above-described small cell antenna may be used for 4×MIMO transmissions.

In some embodiments, the small cell antennas may comprise single-band antennas that have linear arrays of radiating elements that all operate in the same frequency bands (which may be a frequency band that supports a single type of cellular service or a frequency band that encompasses multiple types of cellular service). In other embodiments, multi-band small cell antenna may be provided that include at least two sets of linear arrays, where the linear arrays in the first set include radiating elements that are configured to transmit and receive RF signals in a first frequency band and the linear arrays in the second set include radiating elements that are configured to transmit and receive RF signals in a second frequency band that is different from the first frequency band.

In some embodiments, the linear arrays of the small cell base station antennas may be fed in-phase, meaning that the phases of the sub-components of the RF signal that are provided to the radiating elements of a first linear array are the same as the phases of the sub-components of the RF signal that are provided to the radiating elements of a second linear array. In other embodiments, the feed networks may be designed to feed at least some of the linear arrays out-of-phase such that the phases of the sub-components of the RF signal that are provided to the radiating elements of a first linear array are different than the phases of the sub-components of the RF signal that are provided to the radiating elements of a second linear array. Out-of-phase feeding may provide improved performance (e.g., a broader bi-directional pattern that may be closer in shape to an omnidirectional pattern in the azimuth plane) in some circumstances, particularly with respect to signals in lower frequency ranges. The out-of-phase feeding may involve feeding the linear arrays with sub-components of an RF signal that are about 180 degrees out-of-phase or with smaller phase differences. Out-of-phase feeding may, in some cases, reduce the maximum directivity of the antenna beam, but increase the area where the antenna directivity exceeds a pre-determined level, thereby providing a pattern that has a somewhat omnidirectional shape with coverage gaps therein. Such patterns may be well-suited for small cell base stations that are within the coverage area of a macro cell base station.

Example embodiments of the invention will now be discussed in more detail with reference to the attached drawings.

With the introduction of various fourth generation ("4G") and fifth generation ("5G") cellular technologies, base stations are employing antennas that have multi-input-multi-output ("MIMO") capabilities. As known to those of skill in the art, MIMO refers to a technique where a signal is output through multiple ports of a radio and transmitted through multiple different antenna arrays (or sub-arrays) that are, for example, spatially separated from one another and/or at orthogonal polarizations. The amplitudes and phases of the signals transmitted through the different ports may be set so that the signals transmitted through the multiple antenna arrays will constructively combine at the user device. The use of MIMO transmission techniques may help overcome the negative effects of multipath fading, reflections of the transmitted signal off of buildings and the like to provide enhanced transmission quality and capacity.

Small cell base stations are often implemented in high-density urban environments. These environments may have numerous buildings which make these environments natural applications for using MIMO transmission techniques. MIMO is typically employed in 4G applications because, while more expensive, the added capacity typically justifies the increased cost. If the costs of MIMO capable base station antennas can be reduced then the benefits of using MIMO transmission techniques in terms of network capacity as a function of capital expense may be further increased.

Referring to FIG. 1A, a small cell base station 10 is illustrated. The base station 10 includes an antenna 20 that may be mounted on a raised structure 30. In the depicted embodiment, the structure 30 is a small antenna tower, but it will be appreciated that a wide variety of mounting locations may be used including, for example, utility poles, buildings, water towers and the like. The antenna 20 may have an omnidirectional antenna pattern in the azimuth plane, meaning that the antenna beam generated by the antenna 20 may extend through a full 360 degree circle in the azimuth plane, and may have a suitable beamwidth (e.g., 10-30 degrees) in the elevation plane. The antenna beam may be slightly down-tilted in the elevation plane to reduce interference with adjacent base stations.

The small cell base station 10 further includes base station equipment such as baseband units 40 and radios 42. A single baseband unit 40 and a single radio 42 are shown in FIG. 1A to simplify the drawing, but it will be appreciated that more than one baseband unit 40 and/or radio 42 may be provided. Additionally, while the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. As is known to those of skill in the art, the baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. It will also be appreciated that the base station 10 of FIG. 1A will typically include various other equipment (not shown) such as, for example, a power supply, back-up batteries, a power bus, Antenna Interface Signal Group ("AISG") controllers and the like.

Figure 1B:
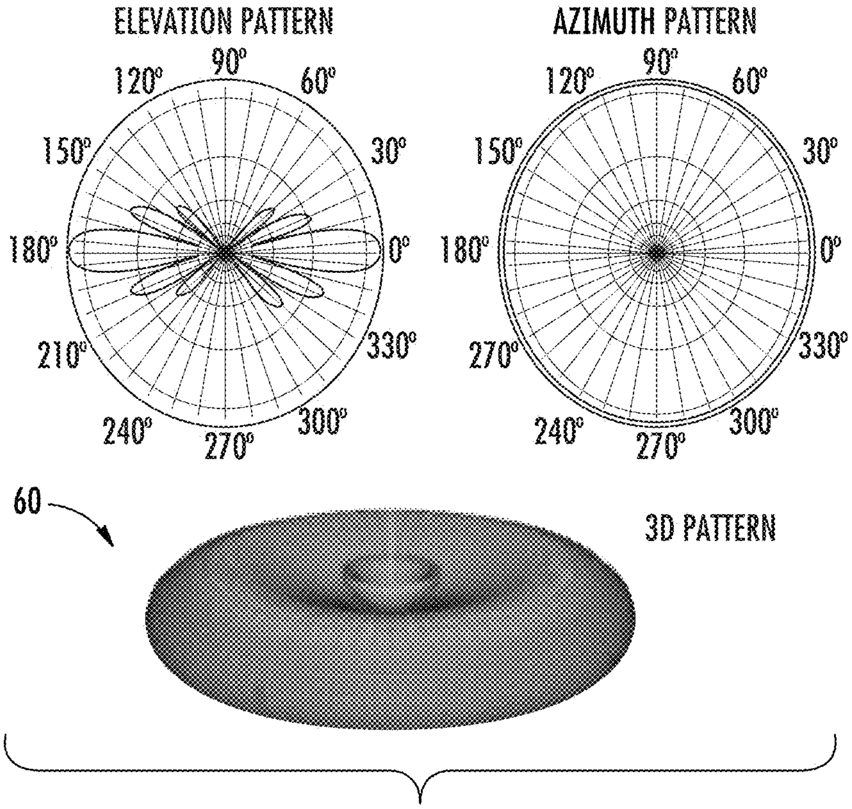
FIG. 1B illustrates an antenna beam that may be generated by the antenna of the small cell base station of FIG. 1A.

FIG. 1B is a composite of several views of an antenna beam 60 having an omnidirectional pattern in the azimuth plane that may be generated by the antenna 20. In particular, FIG. 1B includes a perspective three-dimensional view of the antenna beam 60 (labelled "3D pattern") as well as plots of the azimuth and elevation patterns thereof. The azimuth pattern is generated by taking a horizontal cross-section through the middle of the three dimensional antenna beam 60, and the elevation pattern is generated by taking a vertical cross-section through the middle of the three dimensional beam 60. The three-dimensional pattern in FIG. 1B illustrates the general shape of the generated antenna beam in three dimensions. As can be seen, the antenna beam 60 extends through a full 360 degrees in the azimuth plane, and the antenna beam 60 may have a nearly constant gain in all directions in the azimuth plane. In the elevation plane, the antenna beam 60 has a high gain in the azimuth plane (i.e., parallel to the horizon), but the gain drops off dramatically both above and below the horizon. The antenna beam 60 thus is omnidirectional in the azimuth plane and directional in the elevation plane.

Figure 2A:
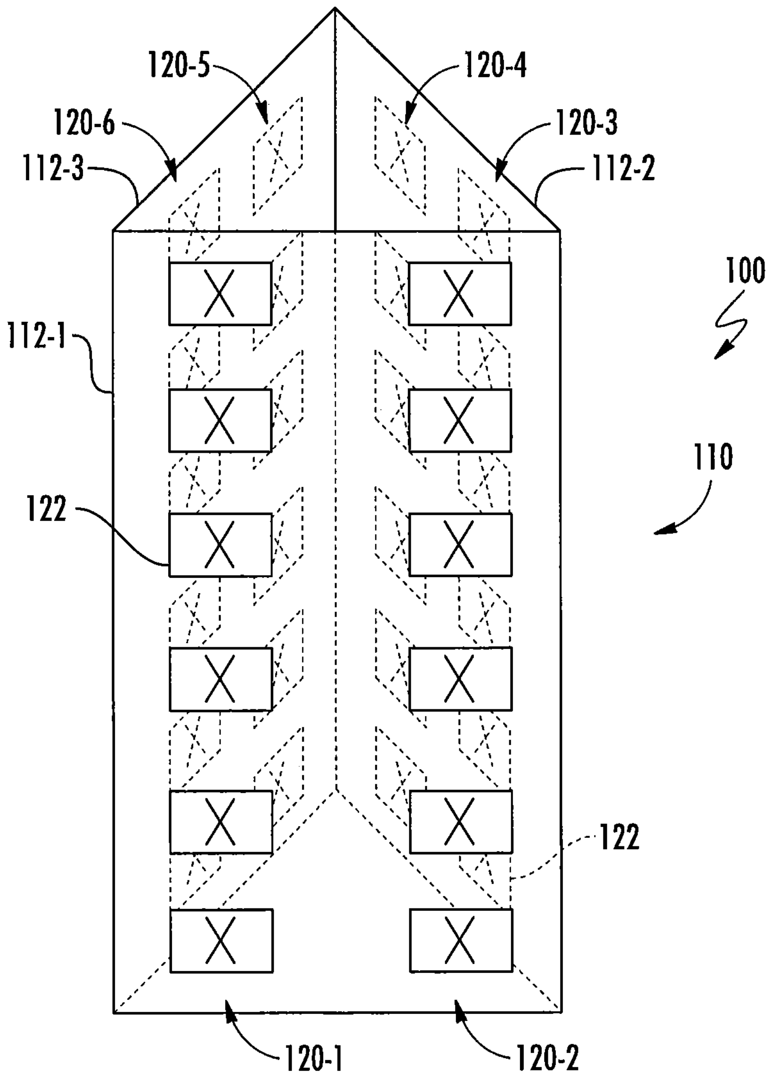
FIG. 2A is a schematic diagram illustrating a small cell base station antenna that uses polarization diversity and horizontal spatial diversity to implement 4×MIMO capabilities.

FIG. 2A is a schematic diagram illustrating a small cell base station antenna 100 that may be used to implement the antenna 20 of FIG. 1A. The small cell base station antenna 100 is configured to use polarization and horizontal spatial diversity to provide 4×MIMO capabilities. 4×MIMO refers to an antenna that can transmit a MIMO signal along four different paths (e.g., through four spatially separated arrays or through two spatially separated arrays that each transmit signals at two different orthogonal polarizations).

As shown in FIG. 2A, the small cell base station antenna 100 includes a tubular triangular reflector assembly 110. The base station antenna 100 further includes six linear arrays 120-1 through 120-6 of radiating elements 122. Each face of the triangular reflector assembly 110 may comprise a backplane 112-1, 112-2, 112-3. Each backplane 112-1, 112-2, 112-3 may comprise a unitary structure or may comprise a plurality of structures that are attached together. Each backplane 112 may comprise, for example, a reflector that serves as a ground plane for the radiating elements 122 of the linear arrays 120 mounted thereon. In some embodiments, the backplanes 112-1, 112-2, 112-3 may comprise a unitary or monolithic structure that serves as all three backplanes 112-1, 112-2, 112-3. It should be noted that herein when multiple like or similar elements are provided they may be labelled in the drawings using a two part reference numeral (e.g., backplane 112-2). Such elements may be referred to herein individually by their full reference numeral (e.g., backplane 112-2) and may be referred to collectively by the first part of their reference numeral (e.g., the backplanes 112).

Two linear arrays 120 are mounted on each backplane 112. Each linear array 120 is mounted to be oriented vertically with respect to the horizon when the base station antenna 100 is mounted for use. In the depicted embodiment, each linear array 120 includes a total of six radiating elements 122. It will be appreciated, however, that any appropriate number of radiating elements 122 may be included in the linear arrays 120. Each of the radiating elements 122 may be identical. The radiating elements 122 may extend forwardly from the respective backplanes 112 (see FIG. 2B).

Figure 3A:
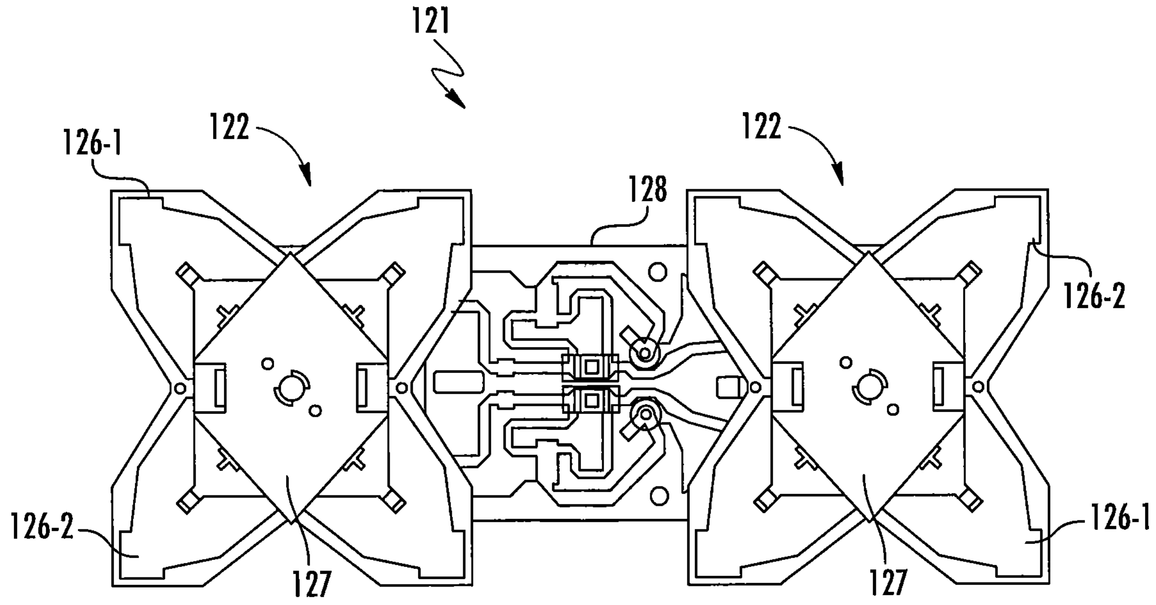
FIGS. 3A and 3B are a front view and a side view, respectively, of two of the radiating elements included in the base station antenna of FIG. 2A.
Figure 3B:
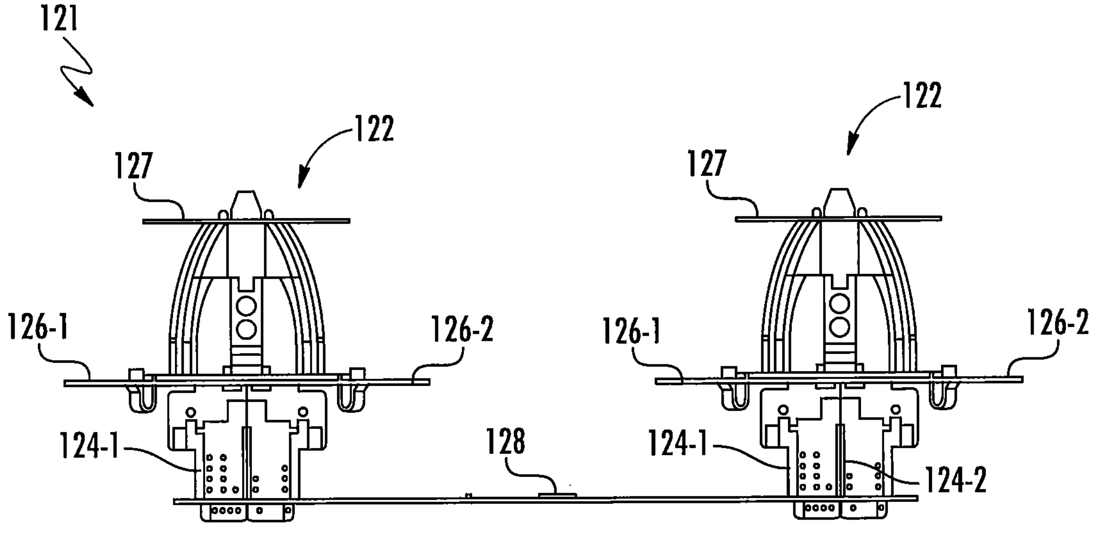

In an example embodiment, each linear array 120 may be implemented as three sub-arrays 121 of radiating elements 122, where each sub-array 121 includes two radiating elements 122 that are mounted on a common feedboard. An example and non-limiting implementation of such a sub-array 121 is depicted in FIGS. 3A-3B. It will be appreciated, however, that sub-arrays 121 may or may not be used in other embodiments, and that any appropriate radiating elements 122 may be used. It will also be appreciated that different types of radiating elements 122 may be more suitable for different frequency bands of operation.

Referring now to FIGS. 3A and 3B, it can be seen that each sub-array 121 may comprise a pair of radiating elements 122 that are mounted on a common feedboard 128. Each radiating element 122 may comprise a pair of stalks 124-1, 124-2 and a pair of radiators 126-1, 126-2. Each stalk 124 may comprise a microstrip printed circuit board. The two printed circuit boards that form the stalks 124-1, 124-2 may be arranged in an "X" configuration when viewed from above the feedboard 128. Each radiator 126 may comprise, for example, a dipole. In the depicted embodiment, the base station antenna 100 is a dual-polarized antenna, and hence each radiating element 122 includes a pair of dipole radiators 126 arranged in a so-called "cross-dipole" arrangement. Each radiator (dipole) 126 may be disposed in a plane that is substantially perpendicular to a longitudinal axis of its corresponding stalk 124. In the depicted embodiment, each sub-array 121 includes a pair of radiating elements 122 that are mounted on a feedboard 128. The feedboard 128 may be configured to split an RF signal that is provided thereto into two sub-components and to feed each sub-component to a respective one of the radiating elements 122. Directors 127 may be mounted above the radiators 126 to narrow the beamwidth of the radiating elements 122.

Figure 2B:
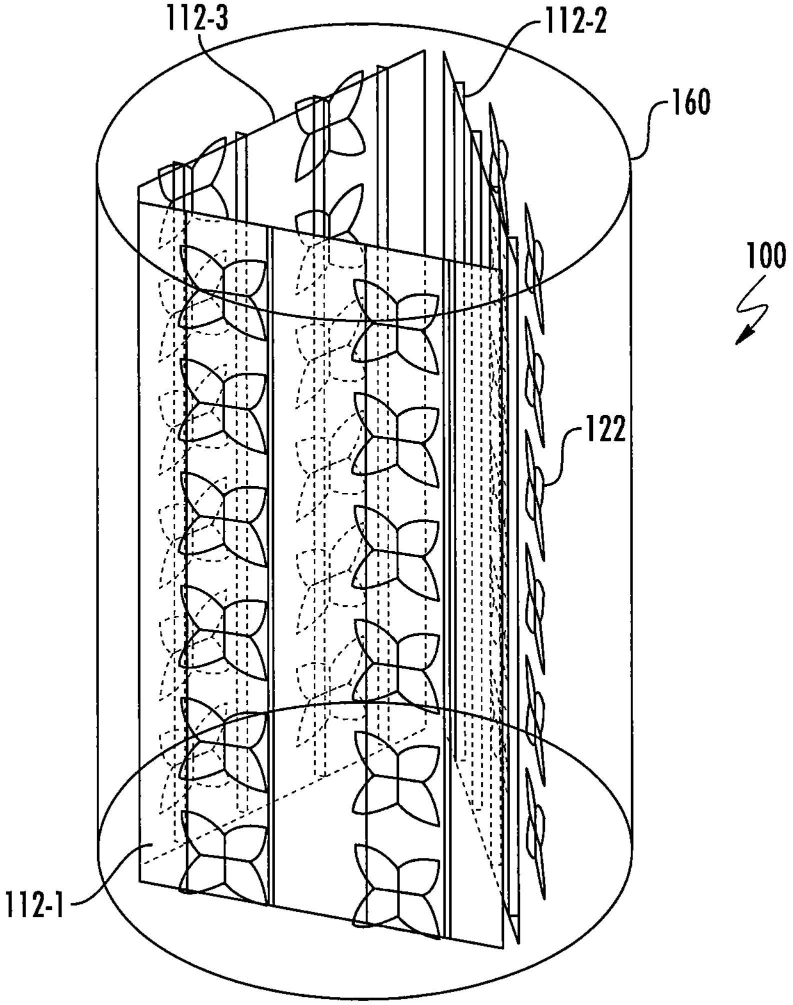
FIG. 2B is another schematic view of the small cell base station of FIG. 2A.

It will be appreciated that the base station antenna 100 may include a number of conventional components that are not depicted in FIG. 2A. For example, the base station antenna 100 may include a radome 160 that covers and protects the radiating elements 122 and other components of the base station antenna 100. The radome 160 may be formed of, for example, extruded plastic. The radome may 160 may be substantially transparent to RF energy in the frequency range in which the base station antenna 100 is designed to operate. FIG. 2B is another schematic view of the base station antenna 100 that schematically depicts such a radome 160. The base station antenna 100 may further include a plurality of RF connectors that allow respective radios (not shown) of the base station to be connected to base station antenna 100. The base station antenna 100 may also include additional connectors in some embodiments such as, for example, AISG connectors that are used to transmit control signals to the base station antenna to, for example, control an electronic down-tilt of the linear arrays 120.

A plurality of circuit elements and other structures may be mounted within the reflector assembly 110. These circuit elements and other structures may include, for example, phase shifters for one or more of the linear arrays 120, remote electronic tilt (RET) actuators for mechanically adjusting the phase shifters, one or more controllers, cabling connections, RF transmission lines and the like. Mounting brackets (not shown) may also be provided for mounting the base station antenna 100 to another structure such as an antenna tower or utility pole.

Figure 4:
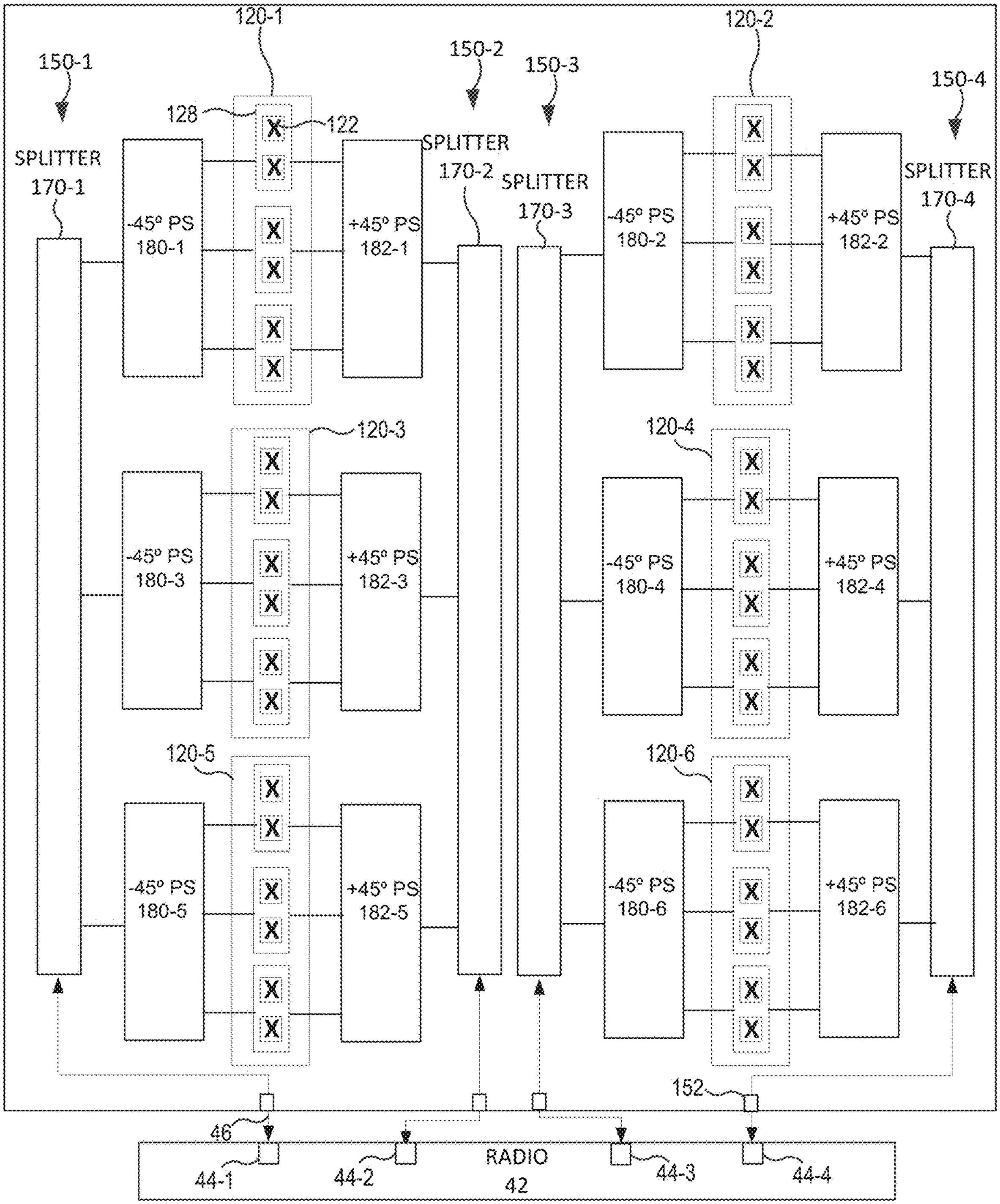
FIG. 4 is a block diagram illustrating the feed networks that may be included in the base station antenna of FIG. 2A.

FIG. 4 illustrates an embodiment of four feed networks 150-1 through 150-4 that may be used to pass RF signals between the base station radio 42 and the radiating elements 122 of the linear arrays 120 of the antenna 100 of FIGS. 2A-2B. As shown in FIG. 4, the radio 42 is a four port device having ports 44-1 through 44-4. Duplexing of the transmit and receive channels is performed internal to the radio 42, so each port 44 on the radio 42 passes both transmitted and received RF signals. The provision of four ports 44 on radio 42 allows the radio 42 to feed signals to different subsets of the linear arrays 120 of base station antenna 100 at two different (orthogonal) polarizations. Since the base station antenna 100 has slant −45°/+45° cross-dipole radiating elements 122, herein the two polarizations will be referred to as the −45° and the +45° polarizations. It will be appreciated, however, that any suitable types of orthogonal polarizations may be used (e.g., horizontal/vertical, right hand circular/left hand circular, etc.). Four connectors 152 may be provided on base station antenna 100 and cables 46 (e.g., coaxial cables) may connect each port 44 on the radio 42 to a respective one of these RF connectors 152.

As shown in FIG. 4, the first port 44-1 of radio 42 is coupled to the radiators 126 of the radiating elements 122 of linear arrays 120-1, 120-3, 120-5 that are arranged to transmit/receive signals having a −45° polarization via a first 1×3 power splitter/combiner 170-1. An RF transmission line (e.g., a coaxial cable) may extend between the connector 152 and the splitter/combiner 170-1. The 1×3 splitter/combiner 170-1 may split RF signals received from port 44-1 into three equal power sub-components. Each output of the splitter 170-1 may be fed to a respective phase shifter 180-1, 180-3, 180-5 that is associated with a respective linear array 120-1, 120-3, 120-5.

The second port 44-2 of radio 42 is coupled to the radiators 126 of the radiating elements 122 of linear arrays 120-1, 120-3, 120-5 that are arranged to transmit/receive signals having a +45° polarization via a second 1×3 power splitter/combiner 170-2. The 1×3 splitter/combiner 170-2 may split RF signals received from port 44-2 into three equal power sub-components that are fed to respective phase shifters 182-1, 182-3, 182-5 that are associated with the respective linear arrays 120-1, 120-3, 120-5. Similarly, the third port 44-3 of radio 42 is coupled to the radiators 126 of the radiating elements 122 of linear arrays 120-2, 120-4, 120-6 that are arranged to transmit/receive signals having a −45° polarization via a third 1×3 power splitter/combiner 170-3 which splits RF signals received from port 44-3 into three equal power sub-components that are fed to respective phase shifters 180-2, 180-4, 180-6 that are associated with the respective linear arrays 120-2, 120-4, 120-6. The fourth port 44-4 of radio 42 is coupled to the radiators 126 of the radiating elements 122 of linear arrays 120-2, 120-4, 120-6 that are arranged to transmit/receive signals having a +45° polarization via a fourth 1×3 power splitter/combiner 170-4 which splits RF signals received from port 44-4 into three equal power sub-components that are fed to respective phase shifters 182-2, 182-4, 182-6 that are associated with the respective linear arrays 120-2, 120-4, 120-6.

As shown in FIG. 4, each phase shifter 180, 182 may split the RF signals input thereto three ways (and the power split may be equal or unequal) and may apply a phase taper across the three sub-components of the split RF signal to, for example, apply an electronic downtilt to the antenna beam that is formed when the sub-components of the RF signal are transmitted (or received) through the respective linear arrays 120 of radiating elements 122. Each of the three outputs of each phase shifter 180, 182 may be connected to a respective one of three feedboards 128 that are included in each linear array 120. As noted above, each feedboard 128 receives a respective sub-component of the RF signal, splits it into two parts, and feeds each part to a radiator 126 of a respective one of the radiating elements 122 mounted on the feedboard 128. In this fashion, the radio 42 may be used to transmit an RF signal via MIMO transmission techniques through four different paths through base station antenna 100, namely a first path using the −45° radiators 126 of the radiating elements 122 of linear arrays 120-1, 120-3, 120-5, a second path using the +45° radiators 126 of the radiating elements 122 of linear arrays 120-1, 120-3, 120-5, a third path using the −45° radiators 126 of the radiating elements 122 of linear arrays 120-2, 120-4, 120-6 and a fourth path using the +45° radiators 126 of the radiating elements 122 of linear arrays 120-2, 120-4, 120-6.

Figure 2C:
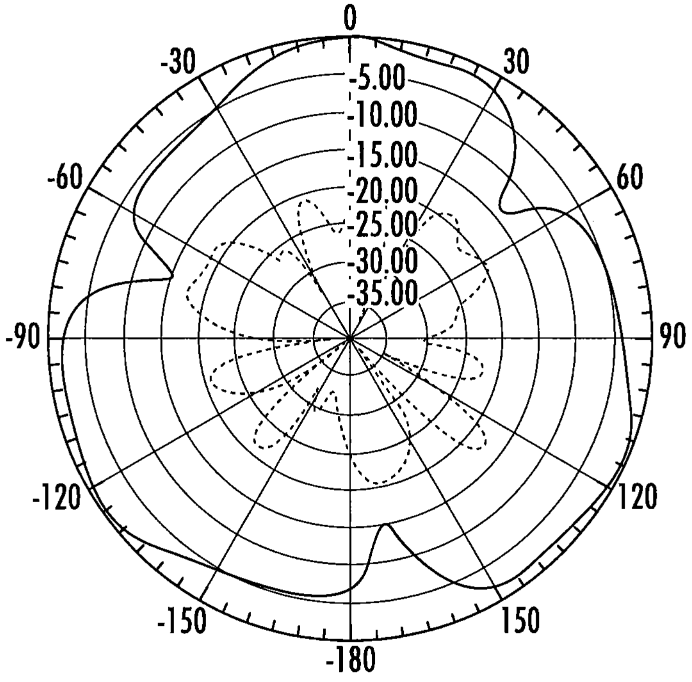
FIGS. 2C and 2D are graphs illustrating azimuth and elevation cross-sections of the antenna beam of the small cell antenna of FIG. 2A.
Figure 2D:
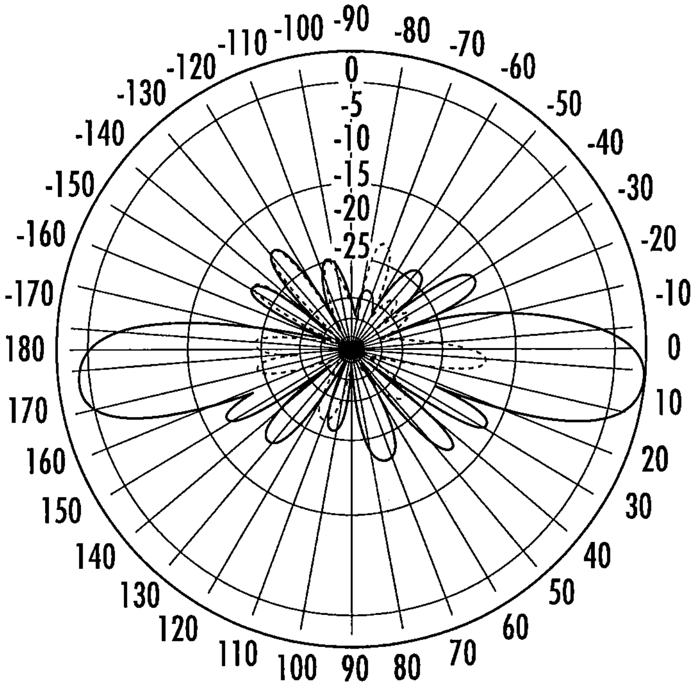

Thus, as explained above, the base station antenna 100 may implement 4×MIMO by transmitting an RF signal at two different polarizations through two different sets of three linear arrays (namely linear arrays 120-1, 120-3, 120-5 and linear arrays 120-2, 120-4, 120-6). FIGS. 2C and 2D are graphs illustrating the antenna beam generated by base station antenna 100 in the azimuth and elevation planes, respectively. As shown in FIGS. 2C and 2D, the antenna beam has an omnidirectional shape in the azimuth plane and has a relatively narrow elevation beamwidth. The linear arrays 120 on each backplane 112 may be spaced apart horizontally by, for example, about 1 wavelength of the center frequency of operation of the radiating elements 122 (e.g., linear array 120-1 may be horizontally spaced apart from linear array 120-2 by about a wavelength). This may provide horizontal spatial diversity so that the signals transmitted by the two different linear arrays 120 that are mounted on each backplane 112 may experience a different multipath fading environment. RF signals that are transmitted at different polarizations also tend to experience different amounts of fading, even when the signals are transmitted along the same physical path. Accordingly, the base station antenna 100 may transmit signals on four paths that will be highly decorrelated, enabling throughput improvements via the implementation of MIMO.

It is anticipated that the base station antenna 100 may exhibit good performance. The base station antenna 100, however, may be larger and more expensive than desirable for some applications. In particular, the base station antenna 100 requires a total of six linear arrays 120, with the linear arrays 120 on each backplane 112 separated by approximately a wavelength or more. This increases the footprint of the base station antenna 100. Additionally, the base station antenna 100 includes a total of thirty-six radiating elements 122.

Figure 5A:
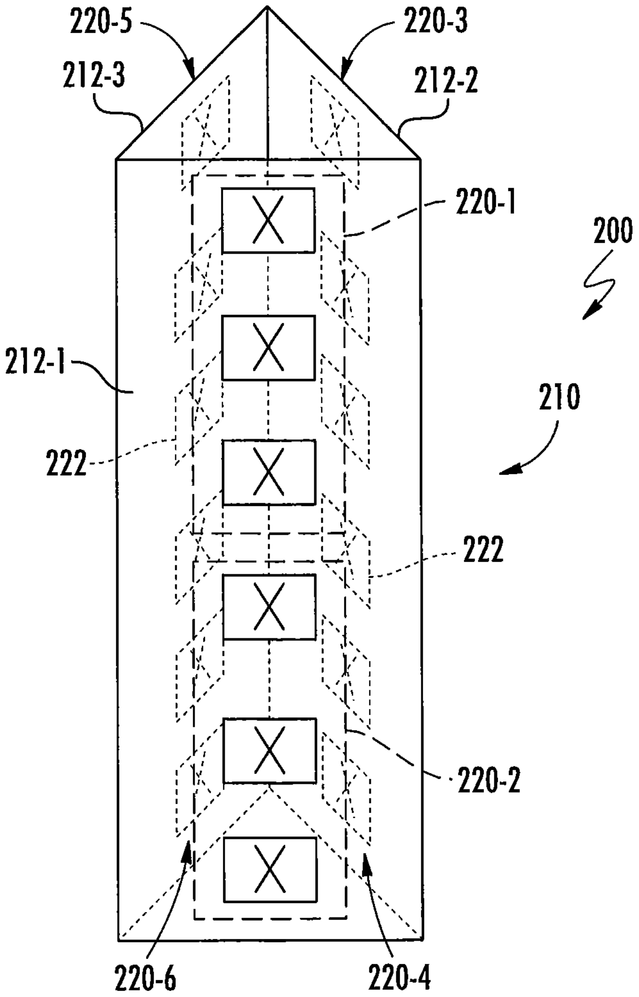
FIG. 5A is a schematic diagram illustrating another small cell base station antenna that uses polarization diversity and vertical spatial diversity to implement 4×MIMO capabilities.
Figure 5B:
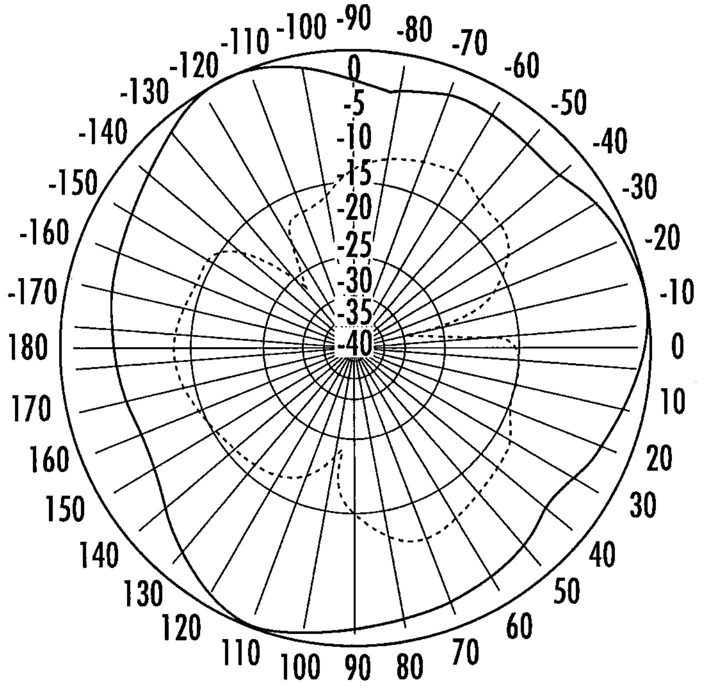
FIGS. 5B and 5C are graphs illustrating the azimuth and elevation cross-sections of the antenna beam of the small cell antenna of FIG. 5A.
Figure 5C:
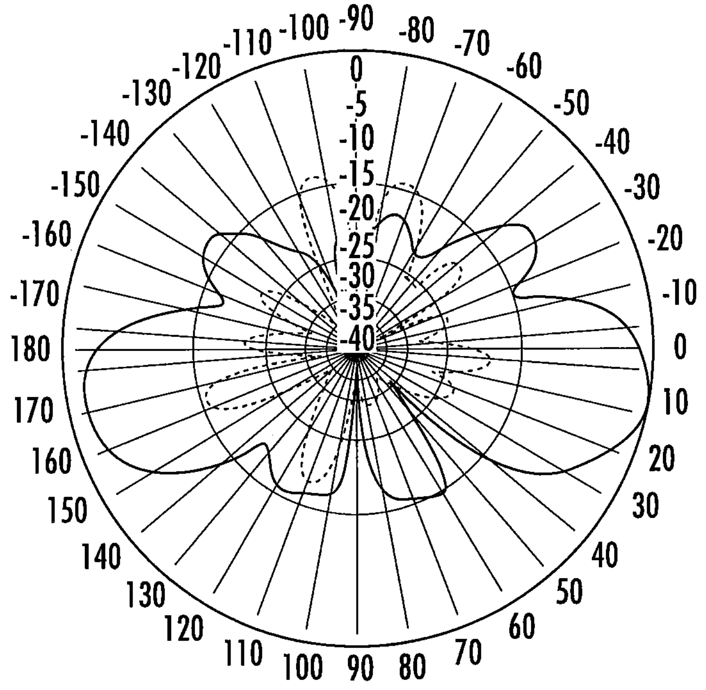

FIG. 5A is a schematic diagram illustrating a small cell base station antenna 200 that uses polarization diversity and vertical spatial diversity to implement 4×MIMO capabilities. FIGS. 5B and 5C are graphs illustrating azimuth and elevation cross-sections of the antenna beam of the small cell antenna 200.

As shown in FIG. 5A, the small cell base station antenna 200 includes a triangular tubular reflector assembly 210. The base station antenna 200 further includes six linear arrays 220-1 through 220-6 of radiating elements 122. Each face of the reflector assembly 210 may comprise a backplane 212-1, 212-2, 212-3. Each backplane 212 may comprise a unitary structure or may comprise a plurality of structures that are attached together. Each backplane 212 may comprise, for example, a reflector that serves as a ground plane for the radiating elements 222 of the linear arrays 220. In some embodiments, the backplanes 212-1, 212-2, 212-3 may comprise a unitary or monolithic structure that serves as all three backplanes 212.

In contrast to the base station antenna 100 described above, which uses horizontal separation between the linear arrays 120, the base station antenna 200 uses vertical separation. In particular, as shown in FIG. 5A, linear arrays 220-1, 220-4 are mounted on backplane 212-1, linear arrays 220-2, 220-5 are mounted on backplane 212-2, and linear arrays 220-3, 220-6 are mounted on backplane 212-3, where each linear array 220 includes three radiating elements 222, and the two linear arrays 220 on each backplane 212 are vertically stacked. Dashed boxes are included on backplane 212-1 to more clearly illustrate the radiating elements 222 that form linear arrays 220-1 and 220-4. Each radiating element 222 may be implemented, for example, using the radiating element design shown in FIGS. 3A-3B (although each radiating element 222 may be mounted on its own feedboard 128). The base station antenna 200 may also include the various other elements, described above, that are included in the base station antenna 100, modified accordingly to account for the fact that the base station antenna 200 only includes half the number of radiating elements included in base station antenna 100.

The base station antenna 200 may also implement 4×MIMO by transmitting an RF signal at two different polarizations through two different sets of three linear arrays (namely linear arrays 220-1, 220-3, 220-5 and linear arrays 220-2, 220-4, 220-6). FIG. 5B illustrates the resulting antenna beam (azimuth plane), which has an omnidirectional pattern. The linear arrays 220 on each backplane 212 are spaced apart vertically to provide vertical spatial diversity so that the RF signals transmitted by the two different linear arrays 220 that are mounted on each backplane 212 may experience a different multipath fading environment.

As shown in FIG. 5B, the base station antenna 200 generates an omnidirectional antenna pattern in the azimuth plane. However, because the linear arrays 220 only include half the number of radiating elements 222 as the linear arrays 120 of radiating elements 122 (and hence are only half as long in the vertical direction), the gain of base station antenna will be about 3 dB less than the gain of base station antenna 100. Thus, it is anticipated that the base station antenna 200 will underperform as compared to the base station 100. Additionally, as shown in FIG. 5C, base station antenna 200 has a significantly larger beamwidth in the elevation plane, which results in increased levels of interference with adjacent base stations and/or an overlying macro cell. Furthermore, in most situations, vertical separation between linear arrays does not lead to as much signal decorrelation as does horizontal separation (as in base station antenna 100) because most structures/obstacles that scatter RF signals are located to the sides of the user terminals that communicate with the base station as opposed to being located above/below the user terminal. This effect may be reduced, but not eliminated, by making the vertical separation between adjacent linear arrays 220 in base station antenna 200 greater than the horizontal separation between the linear arrays 120 in base station antenna 100. Moreover, the small cell environment tends to be an environment where the difference in performance between horizontally and vertically separated linear arrays is the least, making vertically separated linear arrays at least a possibility for small cell base station antennas. It should also be noted that the base station antenna 200 is a simpler and cheaper design as it employs only half as many radiating elements as the base station antenna 100.

Figure 6A:
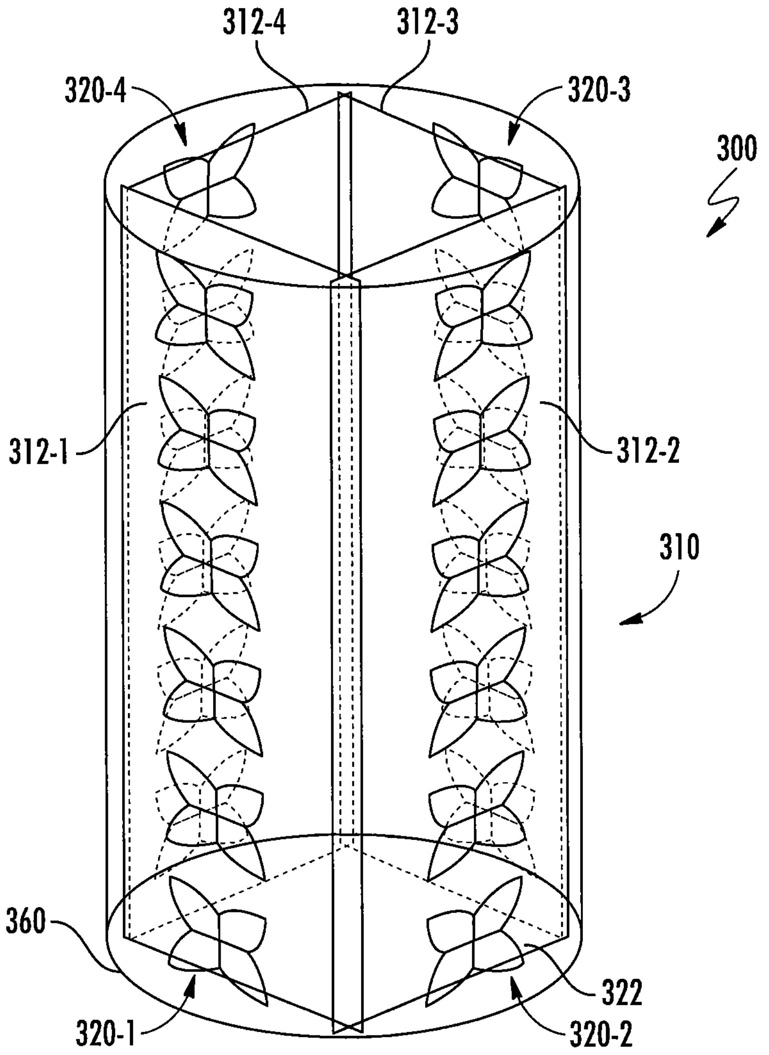
FIG. 6A is a schematic diagram illustrating a small cell base station antenna according to embodiments of the present invention that forms antenna beams having peanut shaped cross-sections in the azimuth plane to provide small cell coverage with MIMO capabilities.
Figure 6B:
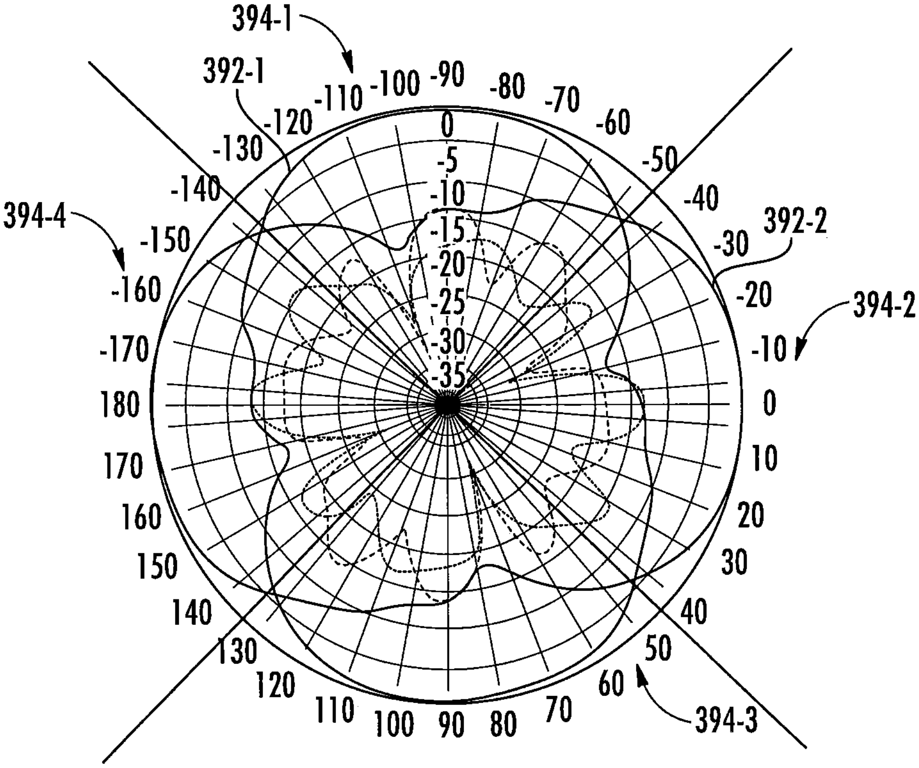
FIGS. 6B and 6C are graphs illustrating azimuth and elevation cross-sections of the antenna beams of the small cell antenna of FIG. 6A.
Figure 6C:
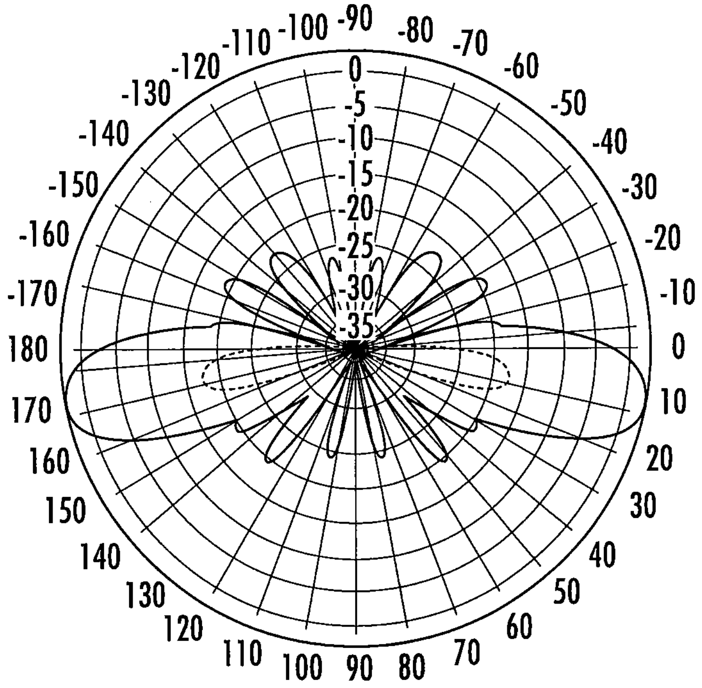

FIG. 6A is a schematic diagram illustrating a small cell base station antenna 300 according to embodiments of the present invention that forms two peanut shaped patterns to provide small cell coverage with MIMO capabilities. Herein, a peanut shaped pattern refers to an antenna pattern having a bi-lobed cross-section through the azimuth plane, where the two lobes extend away from the antenna in opposite directions. FIGS. 6B and 6C are graphs illustrating azimuth and elevation cross-sections of the antenna beam of the small cell antenna 300.

As shown in FIG. 6A, the small cell base station antenna 300 includes a rectangular tubular reflector assembly 310. The base station antenna 300 includes a total of four linear arrays 320-1 through 320-4 of radiating elements 322. Each face of the reflector assembly 310 may comprise a backplane 312-1 through 312-4. Each backplane 312 may comprise a unitary structure or may comprise a plurality of structures that are attached together. Each backplane 312 may comprise, for example, a reflector that serves as a ground plane for the radiating elements 322 of the linear arrays 320 mounted thereon.

Each linear array 320 is mounted on a respective one of the backplanes 312, and may be oriented vertically with respect to the horizon when the base station antenna 300 is mounted for use. In the depicted embodiment, each linear array 320 includes a total of six radiating elements 322. It will be appreciated, however, that other numbers of radiating elements 322 may be included in the linear arrays 320. Each radiating element 322 may be implemented, for example, using the radiating element design shown in FIGS. 3A-3B. The base station antenna 300 further includes a radome 360 that covers and protects the radiating elements 322 and other components of the base station antenna 300.

The base station antenna 300 may further include a number of conventional components that are not depicted in FIG. 6A. For example, a plurality of circuit elements and other structures may be mounted within the reflector assembly 310. These circuit elements and other structures may include, for example, phase shifters for one or more of the linear arrays 320, remote electronic tilt (RET) actuators for mechanically adjusting the phase shifters, one or more controllers, cabling connections, RF transmission lines and the like. Mounting brackets (not shown) may also be provided for mounting the base station antenna 300 to another structure such as an antenna tower or utility pole.

Figure 7:
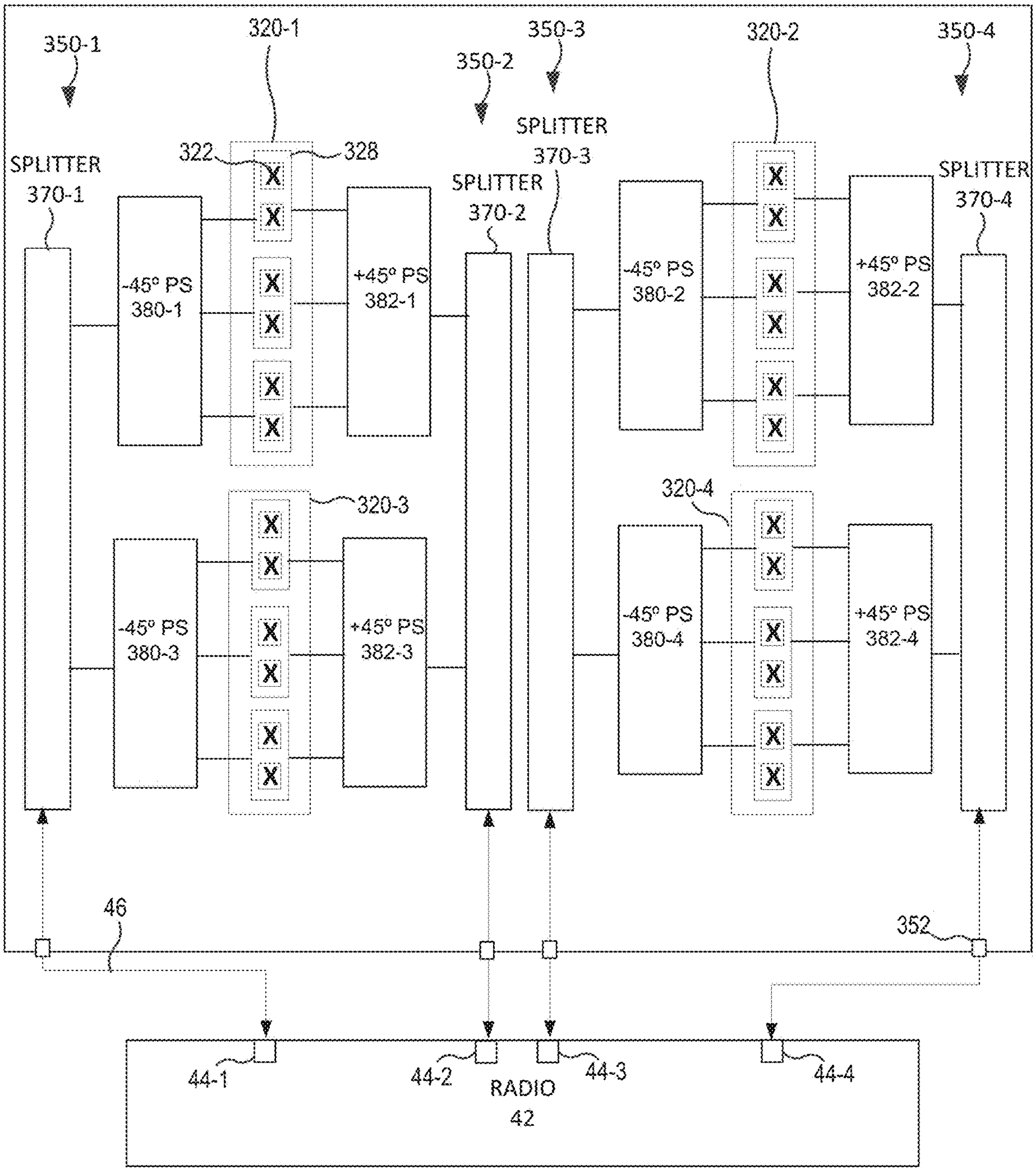
FIG. 7 is a block diagram illustrating the feed networks that may be included in the base station antenna of FIG. 6A.

FIG. 7 illustrates an embodiment of feed networks 350-1 through 350-4 that may be used to pass RF signals between a base station radio 42 and the radiating elements 322 of base station antenna 300. As shown in FIG. 7, the radio 42 is again a four port device having ports 44-1 through 44-4. Duplexing of the transmit and receive channels is performed internal to the radio 42, so each port 44 on the radio 42 passes both transmitted and received RF signals. The provision of four ports 44 on radio 42 allows the radio 42 to feed signals to two different subsets of the linear arrays 320 of base station antenna 300 at two different (orthogonal) polarizations. Since the base station antenna 300 has slant −45°/+45° cross-dipole radiating elements 322, the two polarizations will be referred to as the −45° and the +45° polarizations. Four connectors 352 may be provided on base station antenna 300 and cables 46 (e.g., coaxial cables) may connect each port 44 on the radio 42 to a respective one of these RF connectors 352.

As shown in FIG. 7 the first port 44-1 of radio 42 is coupled to the radiators 126 of the radiating elements 322 of linear arrays 320-1, 320-3 that are arranged to transmit/receive signals having a −45° polarization via a first 1×2 power splitter/combiner 370-1. An RF transmission line (e.g., a coaxial cable) may extend between the connector 352 and the splitter/combiner 370-1. The 1×2 splitter/combiner 370-1 may split RF signals received from port 44-1 into two equal power sub-components. Each output of the splitter 370-1 may be fed to a respective phase shifter 380-1, 380-3 that is associated with a respective linear array 320-1, 320-3. Similarly, the second port 44-2 of radio 42 is coupled to the radiators 126 of the radiating elements 322 of linear arrays 320-1, 320-3 that are arranged to transmit/receive signals having a +45° polarization via a second 1×2 power splitter/combiner 370-2. The splitter/combiner 370-2 may split RF signals received from port 44-2 into equal power sub-components that are fed to respective phase shifters 382-1, 382-3 that are associated with the respective linear arrays 320-1, 320-3. The third port 44-3 of radio 42 is coupled to the radiators 126 of the radiating elements 322 of linear arrays 320-2, 320-4 that are arranged to transmit/receive signals having a −45° polarization via a third power splitter/combiner 370-3 which splits RF signals received from port 44-3 into equal power sub-components that are fed to respective phase shifters 380-2, 380-4 that are associated with linear arrays 320-2, 320-4, respectively. The fourth port 44-4 of radio 42 is coupled to the radiators 126 of the radiating elements 322 of linear arrays 320-2, 320-4 that are arranged to transmit/receive signals having a +45° polarization via a fourth splitter/combiner 370-4 which splits RF signals received from port 44-4 into equal power sub-components that are fed to respective phase shifters 382-2, 382-4 that are associated with linear arrays 320-2, 320-4, respectively.

As shown in FIG. 7, each phase shifter 380, 382 may split the RF signals input thereto three ways (and the power split may be equal or unequal) and may apply a phase taper across the three sub-components of the RF signal to, for example, apply an electronic downtilt to the antenna beam that is formed when the sub-components of the RF signal are transmitted (or received) through the respective linear arrays 320. Each of the outputs of each phase shifter 380, 382 may be connected to a respective one of three feedboards 128 that are included in each linear array 320. The radio 42 may thus transmit an RF signal through four different paths through base station antenna 300, namely a first path using the −45° radiators 126 of the radiating elements 322 of linear arrays 320-1, 320-3, a second path using the +45° radiators 126 of the radiating elements 322 of linear arrays 320-1, 320-3, a third path using the −45° radiators 126 of the radiating elements 322 of linear arrays 320-2, 320-4 and a fourth path using the +45° radiators 126 of the radiating elements 322 of linear arrays 320-2, 320-4.

Unlike base station antennas 100 and 200 described above, base station antenna 300 creates two distinct antenna patterns, since the antenna beam generated by linear arrays 320-1 and 320-3 is oriented differently than the antenna beam generated by linear arrays 320-2 and 320-4. The two distinct antenna patterns can best be seen with reference to FIG. 6B, which illustrates the simulated antenna pattern (azimuth plane) for the base station antenna 300. As shown in FIG. 6B, the first and third linear arrays 320-1, 320-3 may together form a first antenna beam 392-1 that has a peanut-shaped cross-section in the azimuth plane. Likewise, the second and fourth linear arrays 320-1, 320-3 may together form a second antenna beam 392-2 that has a peanut-shaped cross-section in the azimuth plane. Together, the antenna beams 392-1, 392-2 may provide an omnidirectional coverage in the azimuth plane. FIG. 6C illustrates the simulated antenna pattern in the elevation azimuth plane for the base station antenna 300. As can be seen, the elevation pattern may be similar to the elevation pattern for the base station antenna 100 depicted at FIG. 2D above.

It will appreciated that many modifications may be made to the antennas described above without departing from the scope of the present invention. As one example, simpler feed networks may be used in other embodiments. For example, the feed networks 350 illustrated in FIG. 7 include phase shifters 380, 382 which allow electronic adjustment of the elevation angle of the resulting antenna beams 392. In other embodiments, the remote electronic downtilt capabilities may be omitted entirely. In such embodiments, the phase shifters 380, 382 may be replaced with simple power splitter/combiners that do not perform any phase shifting. Thus, it will be appreciated that a wide variety of different feed networks may be used depending upon the specific capabilities implemented in the antennas according to embodiments of the present invention.

Thus, pursuant to some embodiments of the present invention, base station antenna are provided that include first through fourth linear arrays of radiating elements that are mounted in front of respective first through fourth backplanes. These antennas include a first feed network that is coupled to the first and third linear arrays of radiating elements and a second feed network that is coupled to the second and fourth linear arrays of radiating elements. The first linear array of radiating elements is positioned generally opposite the third linear array of radiating elements, and the second linear array of radiating elements is positioned generally opposite the fourth linear array of radiating elements. The first and third linear arrays of radiating elements may be configured to generate a first antenna beam that has a peanut-shaped cross-section in the azimuth plane, and the second and fourth linear arrays of radiating elements may be configured to generate a second antenna beam that has a peanut-shaped cross-section in the azimuth plane. When dual polarized radiating elements are used, the antenna may generate two additional antenna beams having peanut-shaped cross-sections in the azimuth plane.

Pursuant to further embodiments of the present invention, base station antennas are provided that include a first set of radiating elements that are configured to generate a first antenna beam that covers a first sector in an azimuth plane and a third sector in the azimuth plane and a second set of radiating elements that are configured to generate a second antenna beam that covers a second sector in the azimuth plane and a fourth sector in the azimuth plane, where the second sector is between the first sector and the third sector and the fourth sector is between the first sector and the third sector and opposite the second sector. This can be seen, for example, with reference to FIG. 6B, where the cross-section in the azimuth plane is shown divided into four quadrants or sectors 394-1 through 394-4. The first antenna beam 392-1 covers the first and third sectors 394-1 and 394-3, while the second antenna beam 392-2 covers the second and fourth sectors 394-2 and 394-4. As can be seen the second sector 394-2 is between the first and third sectors 394-1 and 394-3, as is the fourth sector 394-4. The azimuth beamwidths of each sector 394 may be approximately the same.

Figure 8:
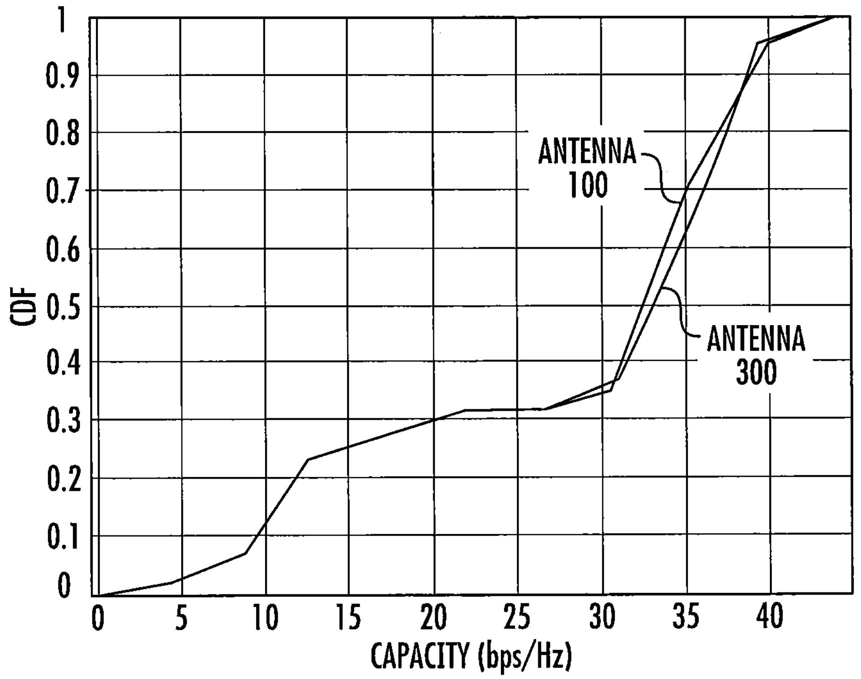
FIGS. 8 and 9 are graphs that compare the performance of the antenna of FIG. 6A to the antennas of FIG. 2A and FIG. 5A, respectively.
Figure 9:
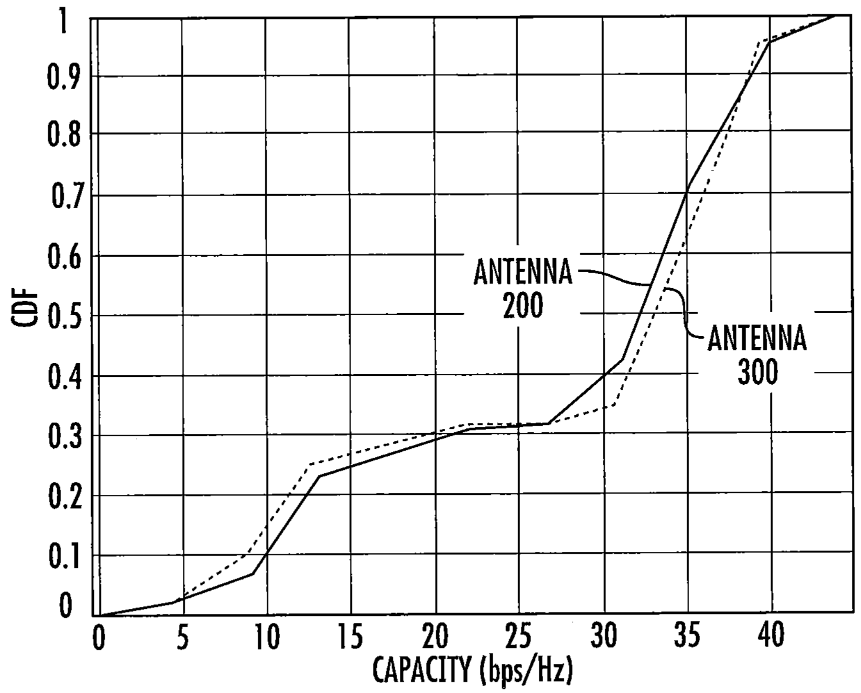

FIGS. 8 and 9 are graphs comparing the simulated performance of the base station antenna 300 as compared to the base station antennas 100 and 200, respectively.

In particular, FIG. 8 illustrates the simulated capacity of a small cell base station using the base station antenna 300 to the simulated capacity of a small cell base station using the base station antenna 100 for cumulative distribution function ("CDF") values ranging from 0 to 1. As shown in FIG. 8, while performance is similar, the base station antenna 300 supports higher capacity for CDF values of 0.5-0.7. As noted above, the base station antenna 300 only includes two thirds the number of radiating elements (24 versus 36) that are included in base station antenna 100, and hence base station antenna 300 may be smaller and significantly cheaper than base station antenna 100, while supporting the same or even greater throughput.

The improved performance for base station antenna 300 as compared to base station antenna 100 that is shown in FIG. 8 may occur because the azimuth antenna patterns for base station antenna 300 are more directional and hence have higher gain than the azimuth antenna pattern for base station antenna 100. On the transmit side the higher link budget provided by the increased antenna gain outweighs the benefit that 4×MIMO transmission techniques have over 2×MIMO. This may occur because 4×MIMO works best when the signal-to-noise ratio is really high and these high signal-to-noise ratio levels may be difficult to achieve in a real world environment unless the user terminal is very close to the base station. On the receive side, the discrimination given by the directional azimuth patterns (which limits interference from other user terminals) outweighs the diversity gain from having four receive paths instead of two receive paths.

Some operators may deploy radios that have two transmit paths and four receive paths which may be used for 2×MIMO transmission techniques and four-way receiver diversity. The antennas according to embodiments of the present invention may be used with such radios. When the radios have two transmit paths and four receive paths, the two transmit ports may be one polarization from linear arrays that form the first peanut-shaped antenna pattern 392-1 and the opposite polarization from the linear arrays that form the second peanut-shaped pattern 392-2. This will provide good coverage while still providing 2×MIMO where the beams overlap (and gain is lowest). In such embodiments, the high gain may be relied upon to make up for the reduced amount of transmission path diversity.

FIG. 9 illustrates the simulated capacity of a small cell base station using the base station antenna 300 to the simulated capacity of a small cell base station using the base station antenna 200 for CDF values ranging from 0 to 1. As shown in FIG. 9, the base station antenna 300 supports higher capacity for almost the entire range of CDF values. The base station antenna 300 does include more radiating elements than base station antenna 200 (24 versus 18), but as shown in FIG. 9, this results in a substantial increase in capacity.

The modelling results of FIGS. 8 and 9 suggest that longer linear arrays with azimuth (horizontal) spatial diversity may provide improved performance as compared to stacked linear arrays that have elevation (vertical) spatial diversity and lower gain. The results also suggest that antennas that form antenna beams having orthogonal peanut-shaped cross-sections in the azimuth plane (e.g., the antenna of FIG. 6A) may provide improved performance as compared to the tri-sector designs illustrated in FIGS. 2A and 5A.

Figure 10:
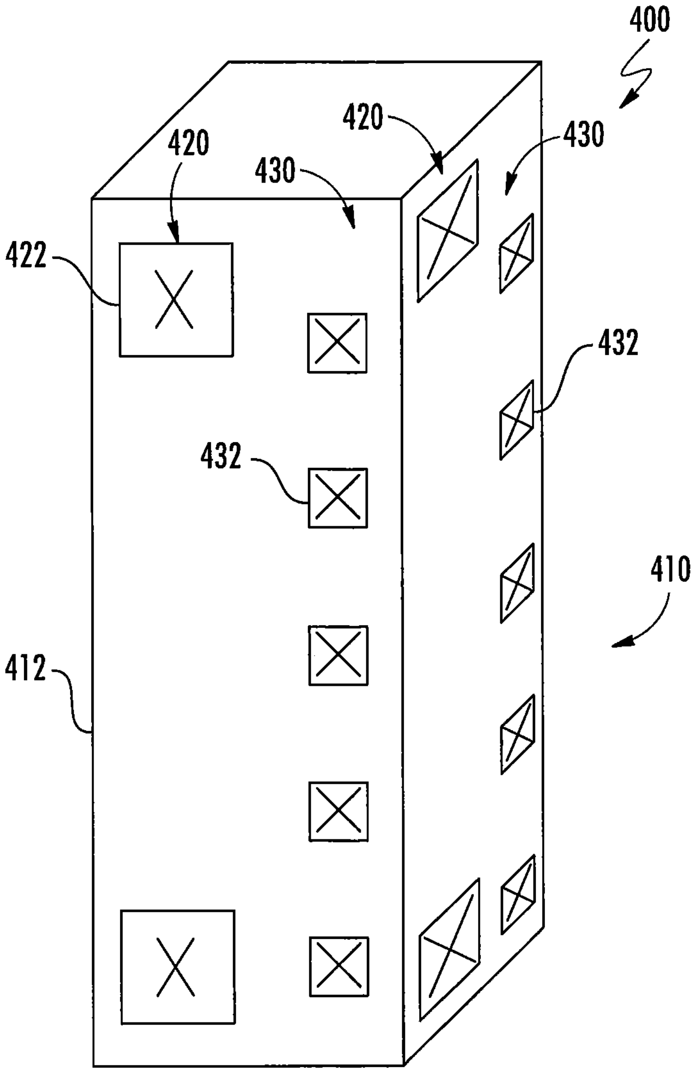
FIG. 10 is a schematic diagram illustrating a multi-band small cell base station antenna according to further embodiments of the present invention.

While FIG. 6A illustrates a single-band base station antenna that generates antenna beams having orthogonal peanut-shaped cross-sections in the azimuth plane, it will be appreciated that multi-band antennas may also be provided. For example, FIG. 10 is a schematic view of one face of a multi-band small cell base station antenna 400 according to further embodiments of the present invention. The base station antenna 400 may be identical to the base station 300 described above, except that the base station antenna 400 includes a second linear array of radiating elements on each of the four backplanes 412 to provide multi-band capabilities.

As shown in FIG. 10, the antenna 400 includes a rectangular tubular reflector assembly 410. The base station antenna 400 includes four high-band (e.g., 2.0 GHz) linear arrays 430 of radiating elements 432, only two of which are visible in the schematic view of FIG. 10. Each face of the reflector assembly 410 may comprise a backplane 412. Each high-band linear array 430 is mounted on a respective one of the backplanes 412. In the depicted embodiment, each high-band linear array 430 includes a total of five radiating elements 432.

The base station antenna 400 further includes four low-band (e.g., 800 MHz) linear arrays 420 of radiating elements 422, only two of which are visible in the schematic view of FIG. 10. A low-band linear array 420 may be mounted on a respective one of the backplanes 412 adjacent the high-band linear array 430. In the depicted embodiment, each low-band linear array 420 includes a total of two radiating elements 422.

Figure 11:
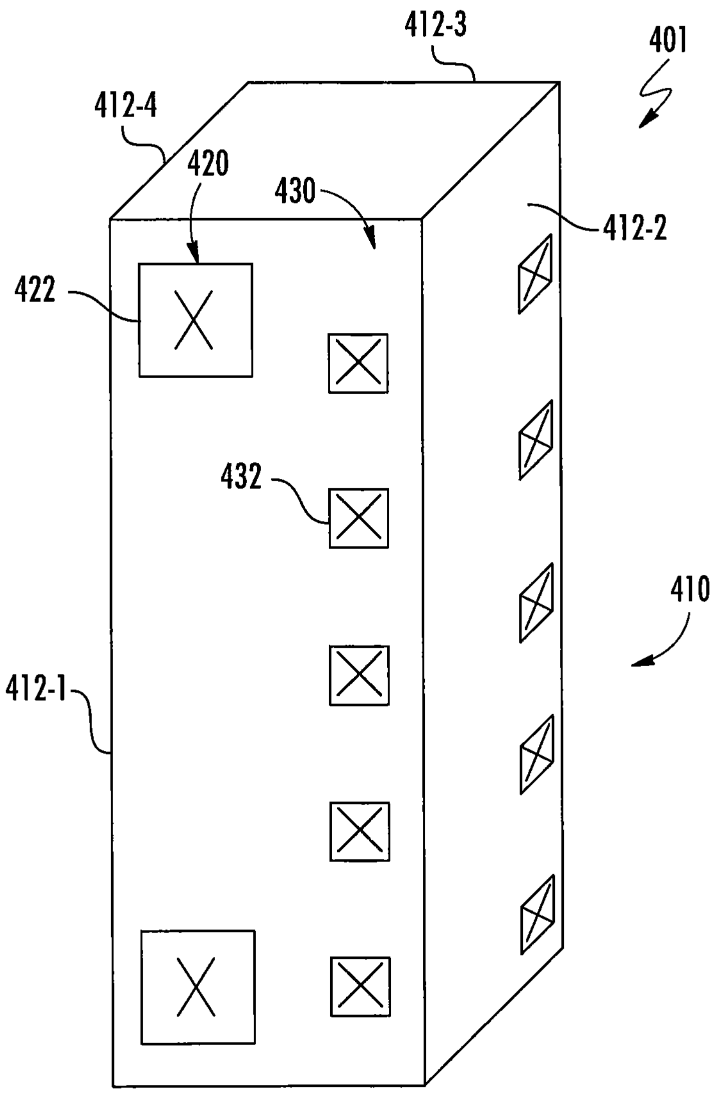
FIG. 11 is a schematic diagram illustrating a modified version of the multi-band small cell base station of FIG. 10.

In the above-described embodiment, all four backplanes 412 of base station antenna 400 have the same design. As shown in FIG. 11, pursuant to a further embodiment of the present invention, a modified version of base station antenna 400 (referred to herein as base station antenna 401) is provided that only implements 2×MIMO in the low band. In this embodiment, the low band radiators 422 are only included on backplanes 412-1 and 412-3 and are omitted from backplanes 412-2 and 412-4. The depths of the respective nulls that are generated in the azimuth pattern at the corners where the edges of the backplanes 412 meet are a function of frequency. Thus, while relatively deep nulls may be generated in the higher band (resulting in the peanut-shaped pattern in the azimuth plane shown in FIG. 6B), the nulls generated in the lower band (which may be, for example, at a frequency that is 2.5 times less than the frequency of the high band) may be much shallower. Thus, in some embodiments, a somewhat omnidirectional pattern may be generated in the azimuth plane using only one pair of linear arrays 420 that are mounted on opposite sides of the tubular rectangular reflector assembly 410. Accordingly, in some embodiments, the base station antenna 401 may implement 4×MIMO in the high band and may only implement 2×MIMO in the low band by omitting the low band linear arrays 420 on backplanes 412-2 and 412-4.

Figure 12:
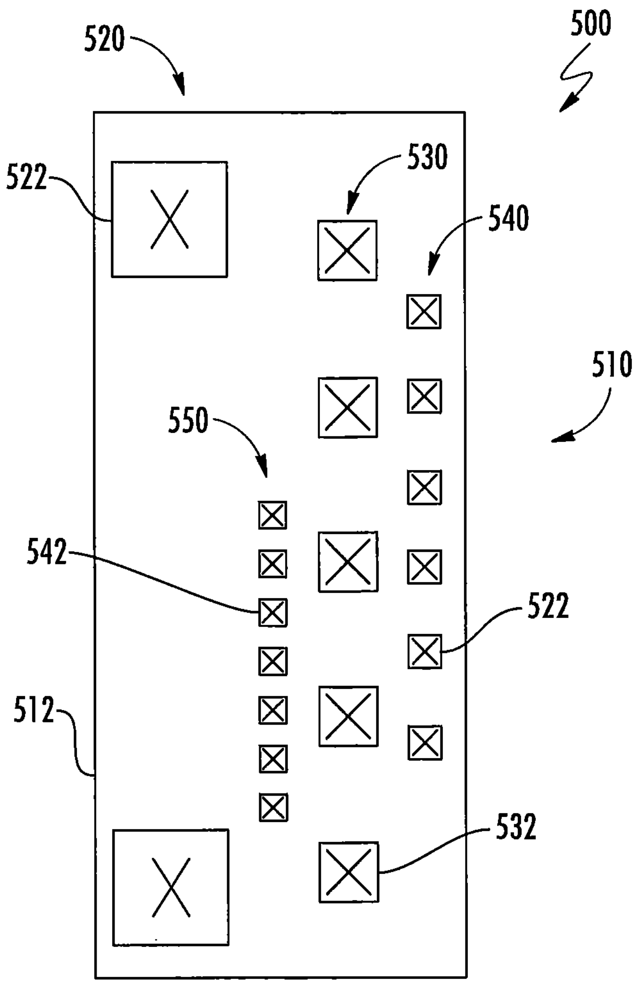
FIG. 12 is a schematic diagram illustrating a multi-band small cell base station antenna according to still further embodiments of the present invention.

FIG. 12 illustrates one backplane 512 of a small cell base station antenna 500 according to further embodiments of the present invention. The base station antenna 500 is similar to the base station antenna 401 described above with reference to FIG. 11, but it further includes two additional sets of linear arrays of radiating elements that operate in two additional frequency bands to provide a four-band small cell base station antenna. The four frequency bands may be, for example, the 800 MHz frequency band, the 2.0 GHz frequency band, the 3.5 GHz frequency band and the 5.0 GHz frequency band. Only one of the four backplanes 512 of base station antenna 500 is illustrated to simplify the drawing.

As shown in FIG. 12, backplane 512 may include a total of four linear arrays 520, 530, 540, 550 mounted thereon. Linear array 520 includes two radiating elements 522 and may operate in the lowest frequency band of operation (e.g., the 800 MHz frequency band). Linear array 520 may be identical to linear array 420 discussed above. As noted above, in some embodiments, only two linear arrays 520 may be included on antenna 500 (on opposed backplanes 512) so that 2×MIMO is implemented in the lowest frequency band as opposed to 4×MIMO.

Linear array 530 includes a total of five radiating elements 532 and may be identical to linear array 430 discussed above. Linear array 530 may operate in the second lowest frequency band of operation (e.g., the 2 GHz frequency band). Base station antenna 500 may include a total of four linear arrays 530 in some embodiments, namely one on each of the four backplanes 512 of the tubular rectangular reflector housing 510.

Linear array 540 includes a total of six radiating elements 542. Linear array 540 may operate in the second highest frequency band of operation (e.g., the 3.5 GHz frequency band). Base station antenna 500 may include a total of four linear arrays 540 in some embodiments, namely one on each of the four backplanes 512 of the tubular rectangular reflector housing 510. The number of radiating elements 542 included in each linear array 540 may vary widely. In some embodiments, a single radiating element 542 may be included in each linear "array" 540.

Linear array 550 includes a total of seven radiating elements 552. Linear array 550 may operate in the highest frequency band of operation (e.g., the 5.5 GHz frequency band). Base station antenna 500 may include a total of two linear arrays 550 in some embodiments, which may be mounted on opposed backplanes (e.g., backplanes 512-1 and 512-3 or backplanes 512-2 and 512-4) of the tubular rectangular reflector housing 510. The number of radiating elements 552 included in each linear array 550 may vary widely. In some embodiments, a single radiating element 552 may be included in each linear "array" 550.

Pursuant to further embodiments of the present invention, small cell base station antennas are provided that have feed networks that feed at least some of the linear arrays thereof out-of-phase. Such out-of-phase feeding may provide improved performance in some circumstances, particularly with respect to signals in lower frequency ranges such as frequency ranges below 3 GHz, although embodiments of the present invention are not limited to such frequency ranges.

Figure 13A:
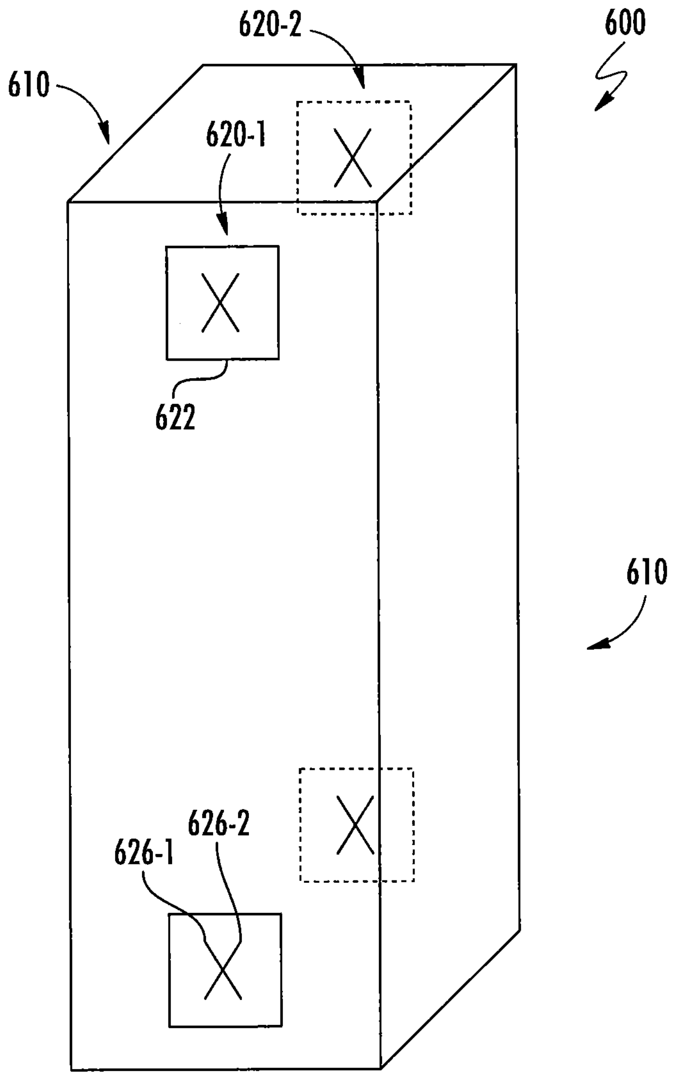
FIG. 13A is a schematic diagram illustrating a small cell base station antenna according to embodiments of the present invention that forms a single antenna beam that may provide coverage for more than 180 degrees in the azimuth plane to provide small cell coverage with MIMO capabilities.

For example, FIG. 13A illustrates a small cell base station antenna 600 according to embodiments of the present invention that implements out-of-phase feeding. The antenna 600 may be very similar to the base station antenna 401 described above with reference to FIG. 11. As shown in FIG. 13A, the antenna 600 includes a rectangular tubular reflector assembly 610 that has four faces and a generally rectangular cross-section. The antenna 600 further includes two low-band (e.g., 800 MHz) linear arrays 620-1, 620-2 of radiating elements 622. The linear arrays 620 may be mounted facing outwardly on opposed faces of the tubular reflector assembly 610. In the depicted embodiment, each low-band linear array 620 includes two low-band radiating elements 622. The base station antenna 600 does not include any high-band linear arrays. The base station antenna 600 may implement 2×MIMO in the low-band.

In contrast to the small cell base station antenna 401 of FIG. 11, the small cell base station antenna 600 of FIG. 13A includes feed networks (not shown, but see FIGS. 14A and 14B) that provide out-of-phase feeding to the two linear arrays 620-1, 620-2. In particular, as with the embodiments described above, an RF signal is output from a radio (not shown) and then split and fed to the two linear arrays 620-1, 620-2, and then further split so as to be fed to the radiating elements 622 thereof. However, in the embodiment of FIG. 13A, the phase of the sub-components of the RF signal that are provided to the radiating elements 622 of linear array

620-1 is made to be different than the phase of the sub-components of the RF signal that are provided to the radiating elements 622 of linear array 620-2. It has been discovered that such out-of-phase feeding of the linear arrays 620-1, 620-2 may result in a broader bi-directional pattern that may be closer in shape to an omnidirectional pattern in the azimuth plane than the antenna pattern that results when the radiating elements 622 of the linear arrays 620-1, 620-2 are fed in-phase.

Figure 13B:
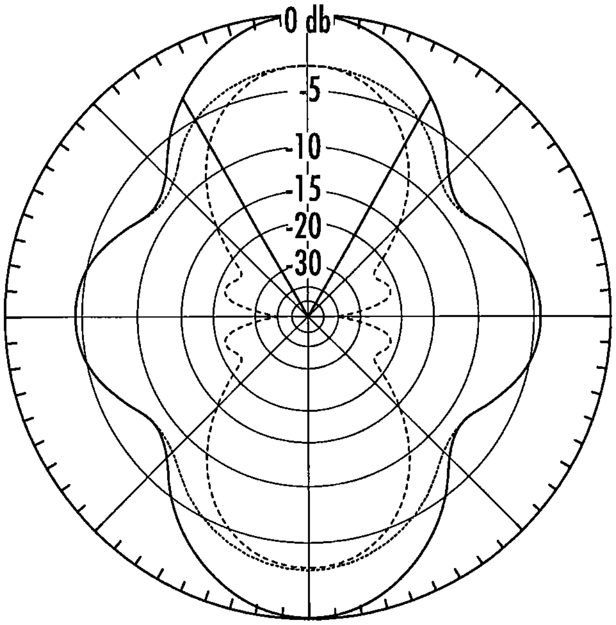
FIG. 13B is a graph illustrating the azimuth cross-section of an antenna beam that may be generated by the small cell antenna of FIG. 13A when the radiating elements thereof are fed in-phase.
Figure 13C:
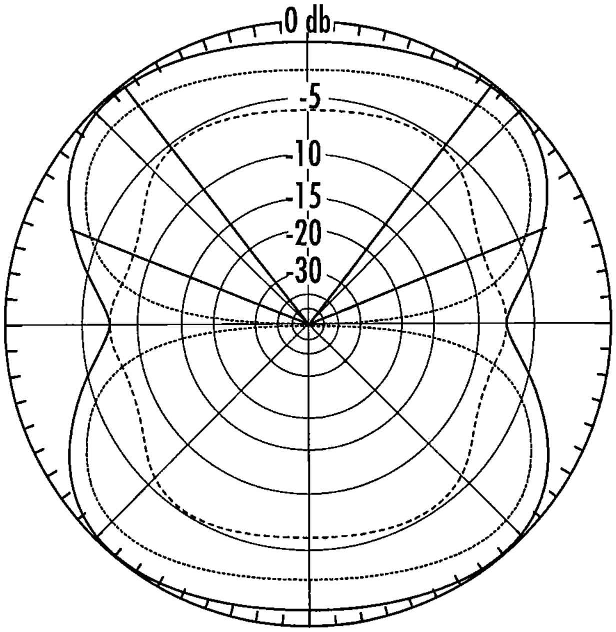
FIG. 13C is a graph illustrating the azimuth cross-section of an antenna beam that may be generated by the small cell antenna of FIG. 13A when the radiating elements thereof are fed 180 degrees out-of-phase.

In some embodiments, the linear arrays 620-1 and 620-2 may be fed in "anti-phase" where the phase of the sub-components of the RF signal that are fed to the respective radiating elements 622 of linear array 620-1 are approximately 180 degrees out-of-phase with respect to the sub-components of the RF signal that are fed to the respective radiating elements 622 of linear array 620-2. FIGS. 13B and 13C illustrate the improvement that this out-of-phase feed arrangement can provide in the shape of the antenna beam in the azimuth plane. In particular, FIG. 13B is a graph illustrating a cross-section in the azimuth plane of the antenna beam that would be generated by the small cell base station antenna 600 if the linear arrays 620-1, 620-2 were fed in-phase (i.e., the phase of the sub-components of the RF signal fed to the radiating elements 622 of each linear array 620-1, 620-2 was the same). As shown in FIG. 13B, the resulting antenna beam has a cruciform shape having two main lobes (that have peaks at the positions 12:00 and 6:00 in FIG. 13B if the plot in FIG. 13B is viewed as the face of a clock) and two minor lobes (that have peaks at the positions 3:00 and 9:00 in FIG. 13B). While not shown in FIG. 13B, in the particular example modelled, the peak directivity of the antenna beam was 7.2 dBi, with the peak directivity occurring at the 12:00 and 6:00 positions in FIG. 13B.

FIG. 13C is a graph illustrating a cross-section in the azimuth plane of the antenna beam that is generated by the small cell base station antenna 600 when the linear arrays 620-1, 620-2 are fed in anti-phase (i.e., the phase of the sub-components of the RF signal that are fed to the radiating elements 622 of linear array 620-1 are approximately 180 degrees out of phase with respect to the sub-components of the RF signal that are fed to the radiating elements 622 of linear array 620-2). As shown in FIG. 13C, by feeding the antenna 600 in anti-phase, the minor peaks that were present in the azimuth pattern of the antenna beam of FIG. 13B are replaced instead with nulls. Additionally, the main beams at the 12:00 and 6:00 positions are broadened substantially. The peak directivity of the antenna beam of FIG. 13C was 4.3 dBi, with the peak directivity occurring near the 1:00, 5:00, 7:00 and 11:00 positions in FIG. 13C.

The performance of a small cell base station antenna is typically driven by the portions of the antenna beam that have the worst performance in the coverage area of the antenna, as it these areas that tend to limit capacity/coverage. As can be seen by comparing FIGS. 13B and 13C, by feeding the linear arrays 620-1 and 620-2 in anti-phase the maximum directivity of the antenna beam is reduced, but the regions where the antenna directivity exceeds a pre-determined level may be increased. Accordingly, by feeding the linear arrays 620-1, 620-2 of antenna 600 out-of-phase it may be possible to increase the coverage area of the resulting antenna beam.

When fed out-of-phase, the small cell base station antenna 600 still does not have a conventional omnidirectional antenna pattern. However, it may generate an antenna beam that provides something close to omnidirectional coverage. For example, when fed in anti-phase, the antenna 600 may be expected to provide coverage for between perhaps two-thirds and three quarters of the 360 degrees that constitute the azimuth plane. As small cell base station antennas are often deployed to provide increased capacity within small regions of the coverage area of a macro cell base station (and may, for example operate in different frequency bands than the macro cell base station in order to avoid interference with the macro cell base station), gaps in the coverage of the small cell base station antenna may be acceptable as mobile users within these "gap" regions may be served by the macro cell base station.

One advantage of the small cell base station antenna 600 as compared to a similar antenna that includes an additional linear array 620 of radiating elements on each of the other two faces of the tubular reflector assembly 610 is that the number of radiating elements, feed networks, phase shifters and splitters may be cut in half when only two linear arrays 620-1, 620-2 are provided. This may significantly reduce the complexity, weight and the cost of the antenna, and may allow for a small reduction in the overall size of the antenna. While improved performance may be obtained by adding the two extra linear arrays 620 on the other two faces of the rectangular tubular reflector assembly 610, the associated cost may not be worth the increase in capacity/performance in many cases, particularly if the small cell base station antenna 600 can provide something relatively close to omnidirectional coverage. This is particularly true in cases where the small cell base station antenna is located within the coverage region of a macro cell base station.

Figure 13D:
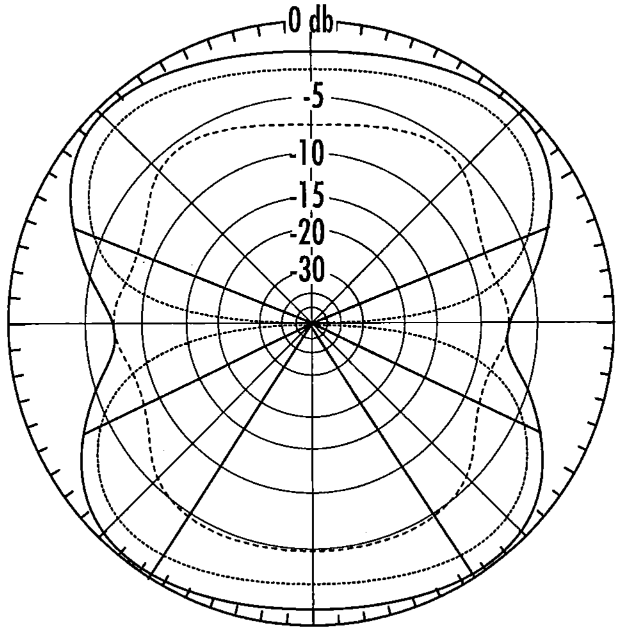
FIG. 13D is a graph illustrating the azimuth cross-section of an antenna beam that may be generated by the small cell antenna of FIG. 13A when the radiating elements thereof are fed 170 degrees out-of-phase.

While FIG. 13C illustrates a scenario where the linear arrays 620-1, 620-2 of antenna 600 are fed with RF signals that are approximately 180 degrees out of phase, it will be appreciated that embodiments of the present invention are not limited thereto. For example, FIG. 13D is a graph illustrating a cross-section in the azimuth plane of the antenna beam that is generated by the small cell base station antenna 600 when the linear arrays 620-1, 620-2 are fed with RF signals that are 170 degrees out-of-phase with respect to each other. As shown in FIG. 13D, the resulting antenna pattern is quite similar to the antenna pattern shown in FIG. 13C. The peak directivity for the antenna pattern of FIG. 13D is 4.5 dBi, which is actually slightly higher than the anti-phase feeding case of FIG. 13C. Moreover, the coverage in the azimuth plane is almost identical to that shown in FIG. 13C. Notably, the antenna beam of FIG. 13D is not perfectly symmetrical, although the small degree of anti-symmetry is unlikely to have a significant effect on performance.

Figure 13E:
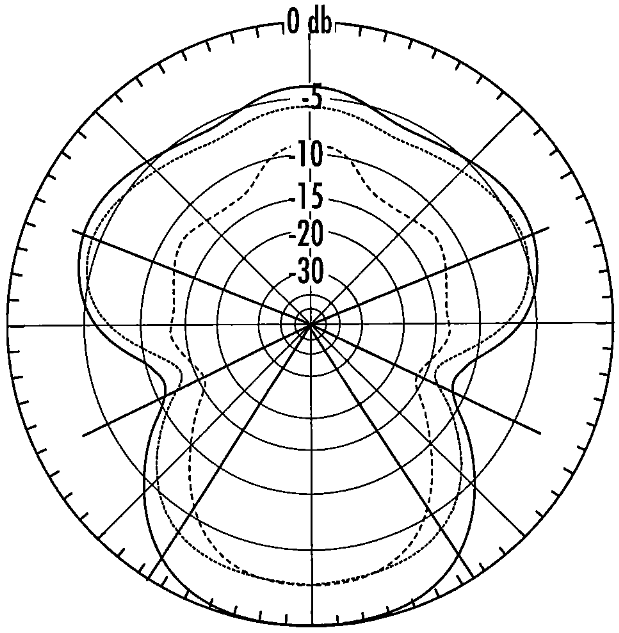
FIG. 13E is a graph illustrating the azimuth cross-section of an antenna beam that may be generated by the small cell antenna of FIG. 13A when the radiating elements thereof are fed 90 degrees out-of-phase.

It will also be appreciated that in some cases out-of-phase feeding may result in antenna beams that are farther away from an omnidirectional antenna beam than would be achieved with in-phase feeding. For example, FIG. 13E is a graph illustrating a cross-section in the azimuth plane of the antenna beam that is generated by the small cell base station antenna 600 when the linear arrays 620-1, 620-2 are fed with RF signals that are 90 degrees out-of-phase with respect to each other. As shown in FIG. 13E, the resulting antenna pattern is highly asymmetric and in many cases would only provide sufficient gain over a small range of azimuth angles.

In some embodiments of the present invention, a small cell base station antenna may be provided that includes a first set of radiating elements that are arranged as a first linear array of radiating elements and a second set of radiating elements that are arranged as a second linear array of radiating elements. The second linear array may be mounted opposite the first linear array and may point in a different direction than the first linear array. The base station antenna may further include a feed network that couples the first and second sets of radiating elements to a radio, wherein the feed network is configured to feed the first set of radiating elements out-of-phase with respect to the second set of radiating elements.

As shown in FIG. 13A above, in some embodiments, the first linear array 620-1 may point in a first direction in the azimuth plane and the second linear array 620-2 may point in a second direction in the azimuth plane that is rotated in the azimuth plane by approximately 180 degrees from the first direction. In some embodiments, the first set of radiating elements 622 that form the first linear array 620-1 may be fed with respective sub-components of an RF signal that are approximately 180 degrees out-of-phase with respect to the respective sub-components of an RF signal that is fed to a second set of radiating elements 622 that form the second linear array 620-2. It will be appreciated, however, that anti-phase feeding (i.e., a 180 degree difference in the phases of the sub-components of the RF signal that are fed to the respective linear arrays 620-1, 620-2) of the linear arrays 620-1, 620-2 is just one example embodiment. In other embodiments, the first set of radiating elements 622 that form the first linear array 620-1 may be fed out-of-phase with respect to the second set of radiating elements 622 that form the second linear array 620-2 by anywhere between 135 degrees and 225 degrees. It will be appreciated that the out-of-phase feeding is separate and distinct from any phase shifts that are applied to the signals fed to individual radiating elements (or sub-arrays of radiating elements) in order to apply an electrical downtilt to the antenna beam.

In some embodiments, the first and second sets of radiating elements 622 may each be configured to operate in a frequency band that is within a frequency range of between 600 MHz and 1 GHz. In some embodiments, the first and second linear arrays 620-1, 620-2 may each include two radiating elements 622, although embodiments of the present invention are not limited thereto.

In some embodiments, each radiating element 622 in the first and second sets of radiating elements 620-1, 620-2 may be a dual-polarized radiating element 622 that includes a first radiator 626-1 that is configured to transmit and receive RF signals having a first polarization and a second radiator 626-2 that is configured to transmit and receive RF signals having a second polarization that is opposite the first polarization. In such embodiments, a pair of feed networks may be included in the antenna 600, where the first feed network couples the first radiators 626-1 of the radiating elements 622 of the first and second linear arrays 620-1, 620-2 to a first port of a radio (not shown), and the second feed network couples the second radiators 626-2 of the radiating elements 622 of the first and second linear arrays 620-1, 620-2 to a second port of the radio (not shown). The first and second feed networks may feed the radiators in the respective first and second linear arrays 620-1, 620-2 out-of-phase.

The first and second linear arrays 620-1, 620-2 may generate an antenna beam that has a generally peanut-shaped cross-section in an azimuth plane, except that the main lobes are expanded in size so that the antenna beam can provide coverage over a substantial portion of the azimuth plane. In some embodiments, the antenna beam may provide coverage over at least half the azimuth plane. In other embodiments, the antenna beam may provide coverage over at least two thirds of the azimuth plane. In still other embodiments, the antenna beam may provide coverage over at least three quarters of the azimuth plane.

Figure 14A:
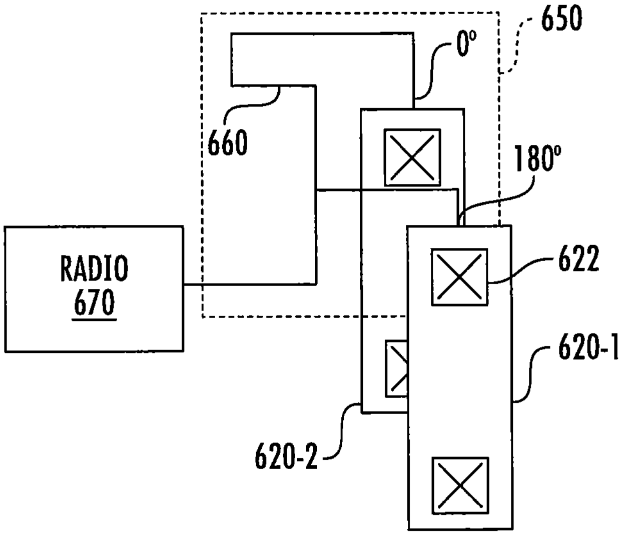
FIG. 14A is a schematic diagram illustrating a feed network that may be used to feed a pair of linear arrays of radiating elements out-of-phase.
Figure 14B:
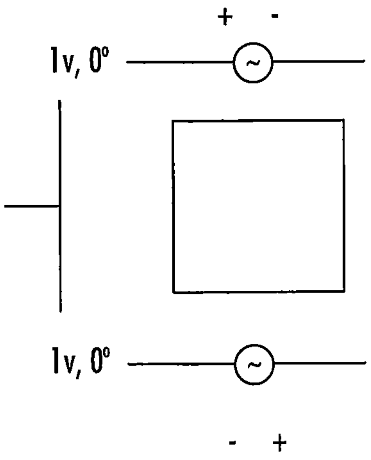
FIG. 14B is a schematic diagram illustrating an alternative feed network that may be used to feed a pair of linear arrays of radiating elements out-of-phase.

The antenna 600 may be fed out-of-phase in various ways. For example, as shown in FIG. 14A, in a first embodiment, a feed network 650 may be used to feed the first and second linear arrays 620-1, 620-2 of radiating elements 622. The feed network may include a delay line 660 in the feed path to one of the linear arrays (here linear array 620-2) that injects a phase shift of, for example, 180 degrees with respect to the RF signals fed to the other linear array 620-1. In other embodiments, the delay line may be replaced with other delay or phase shifting elements such as, for example, a phase shifter. As another example, as shown schematically in FIG. 14B, the radiating elements 622 in the first linear array 620-1 may be fed by a transmission line having a first polarity and the radiating elements 622 in the second linear array 620-2 may be fed by a transmission line having a second polarity (in other words, the connection of the positive and negative paths of the transmission line are reversed for the two linear arrays 620). One advantage of this approach is that the phase difference between the RF signals fed to the first and second linear arrays 620-1, 620-2 may be maintained over the full frequency range, whereas when a delay line such as the feed network of FIG. 14A is used the phase shift will vary across the frequency band.

It will be appreciated that the out-of-phase feed techniques described above with reference to FIGS. 13A-13E may be applied in other frequency bands and in other ways. For example, the same techniques may be used with higher band radiating elements, although typically the higher the frequency the farther the antenna beam will be from omnidirectional coverage in the azimuth plane. Additionally, the out-of-phase feed techniques may also be used to provide enhanced coverage in antennas that have, for example, four linear arrays that are configured to generate a pair of peanut-shaped antenna patterns when the two pairs of linear arrays are each fed in-phase.

Figure 15:
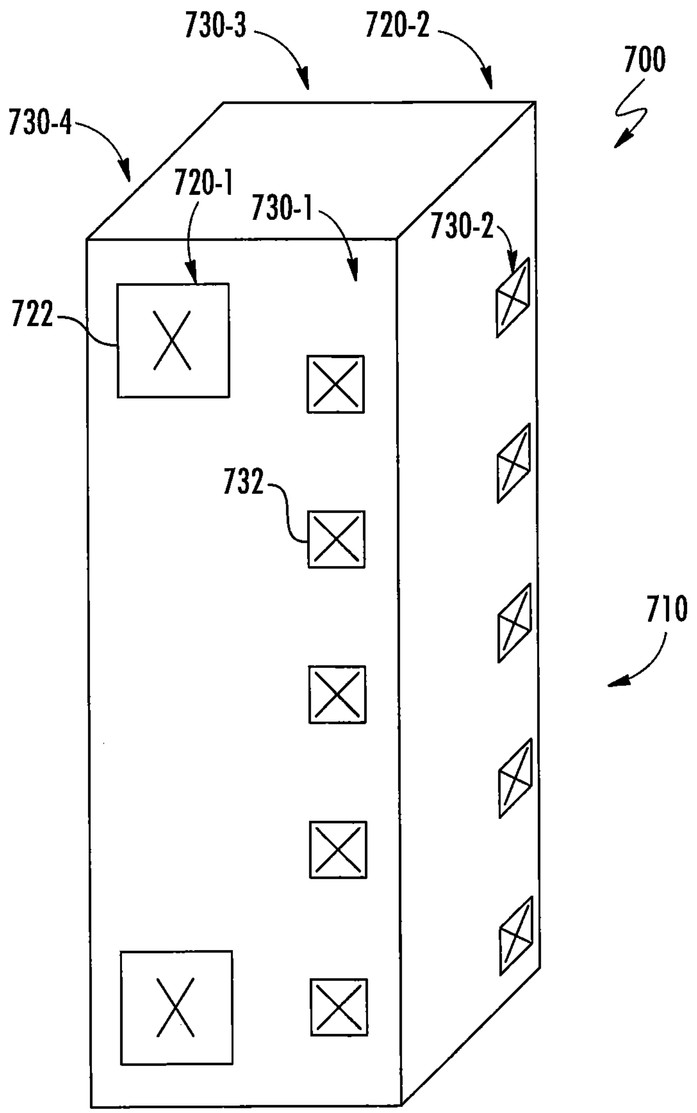
FIG. 15 is a schematic diagram illustrating a dual-band small cell base station antenna according to embodiments of the present invention that uses out-of-phase feeding techniques in each of the two frequency bands of operation to enhance the coverage in the azimuth plane.

For example, FIG. 15 is a schematic diagram illustrating small cell base station antenna 700 according to embodiments of the present invention that may externally appear to be identical to the base station antenna 401 of FIG. 11. However, the base station antenna 700 differs from the base station antenna 401 in that the feed networks of the base station antenna 700 are configured to feed the linear arrays 720-1 and 720-2 out-of-phase, to feed the linear arrays 730-1 and 730-3 out-of-phase, and to feed the linear arrays 730-2 and 730-4 out-of-phase. As aside from the out-of-phase feed networks, the elements of antenna 700 may be identical to the similarly numbered elements of antenna 401, further description thereof will be omitted here.

FIGS. 16A-19 are schematic diagrams illustrating small cell base station antennas according to still further embodiments of the present invention. In particular, FIGS. 16A-16B, 17A-17B and 18-19 illustrate additional small cell base station antennas that have four ports for the low band. In each case, the antenna supports four low band ports with an antenna package that may be the same size as, for example, the small cell base station antennas 401 and 700 of FIGS. 11 and 15, respectively, which each have only two low band ports in the configurations shown.

Figure 16A:
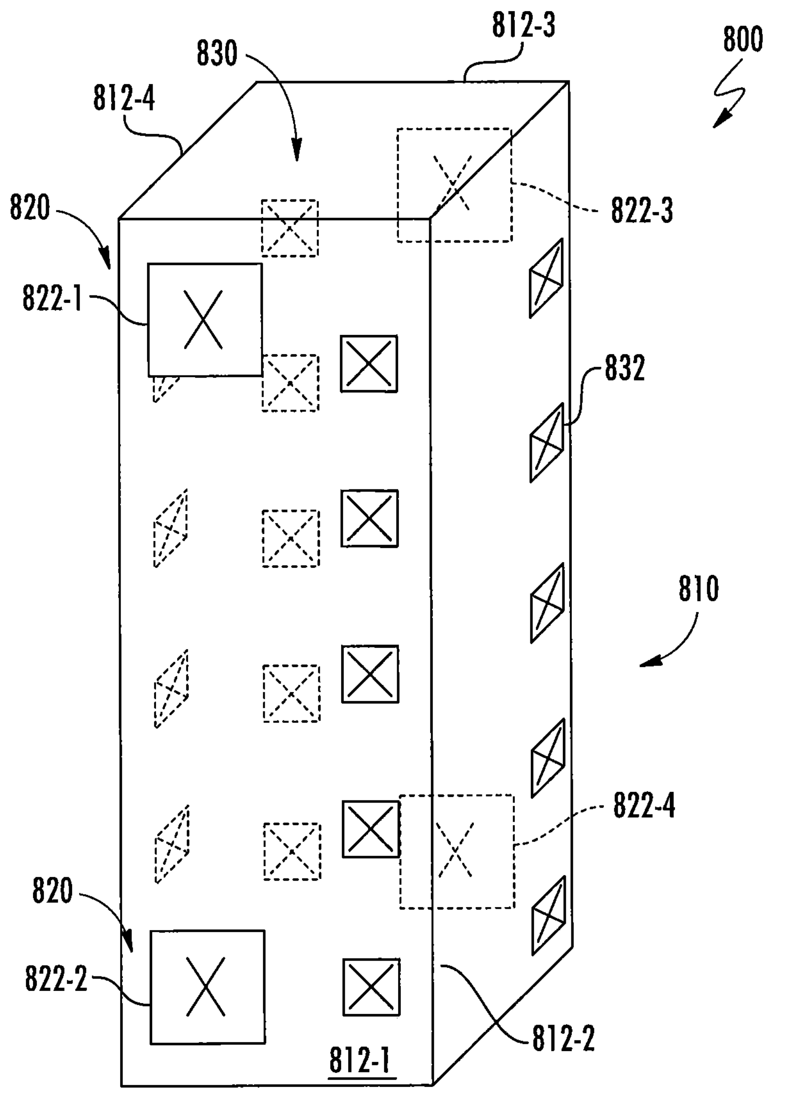
FIG. 16A is a schematic diagram illustrating a small cell base station antenna according to still further embodiments of the present invention.

Referring first to FIG. 16A, a small cell base station antenna 800 is schematically shown that is similar to the small cell base station antenna 401 of FIG. 11. As shown in FIG. 16A, the small cell base station antenna 800 includes a rectangular tubular reflector assembly 810 that has four high-band (e.g., 2.0 GHz) linear arrays 830 of radiating elements 832 and four low-band (e.g., 800 MHz) linear arrays 820 of radiating elements 822 mounted thereon. Each face of the reflector assembly 810 may comprise a backplane 812. A respective high-band linear array 830 is mounted on each of the four backplanes 812-1 through 812-4, while low band radiating elements 822 are only mounted on backplanes 812-1 and 812-3. Each high-band linear array 830 includes a total of five radiating elements 832, while each low-band linear array 820 includes a single radiating element 822.

Figure 16B:
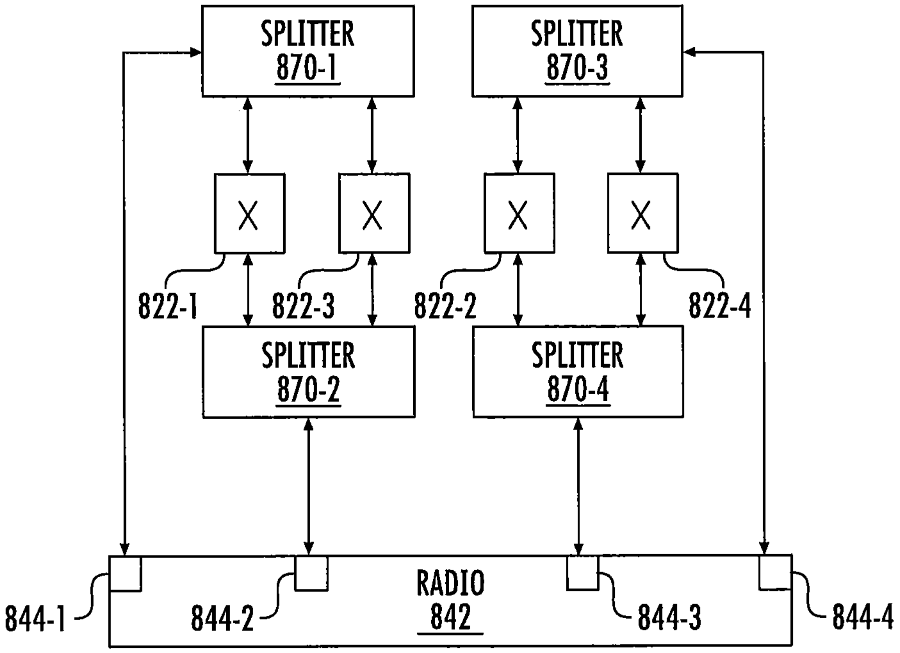
FIG. 16B is a block diagram illustrating how the low band radiating elements of the small cell base station antenna of FIG. 16A may be connected to a four-port radio.

FIG. 16B illustrates the connections between a four-port radio 842 and the low band radiating elements 822 of the small cell base station antenna 800. As shown in FIG. 16B, a first port 844-1 of the radio 842 is coupled to a first splitter 870-1. The first splitter 870-1 splits a (transmit path) RF signal received from port 844-1 into two sub-components that are fed to the +45° dipoles of low band radiating elements 822-1 and 822-3 in order to generate a first, generally peanut-shaped antenna beam having a +45° polarization. Similarly, a second port 844-2 of the radio 842 is coupled to a second splitter 870-2. The second splitter 870-2 splits a (transmit path) RF signal received from port 844-2 into two sub-components that are fed to the −45° dipoles of low band radiating elements 822-1 and 822-3 in order to generate a second, generally peanut-shaped antenna beam having a −45° polarization. A third port 844-3 of the radio 842 is coupled to a third splitter 870-3. The third splitter 870-3 splits a (transmit path) RF signal received from port 844-3 into two sub-components that are fed to the +45° dipoles of low band radiating elements 822-2 and 822-4 in order to generate a third, generally peanut-shaped antenna beam having a +45° polarization. Similarly, a fourth port 844-4 of the radio 842 is coupled to a fourth splitter 870-4. The fourth splitter 870-4 splits a (transmit path) RF signal received from port 844-4 into two sub-components that are fed to the −45° dipoles of low band radiating elements 822-2 and 822-4 in order to generate a fourth, generally peanut-shaped antenna beam having a −45° polarization. In this fashion, a total of four transmit antenna beams may be formed to support 4×MIMO transmissions or other four-port schemes.

Figure 17A:
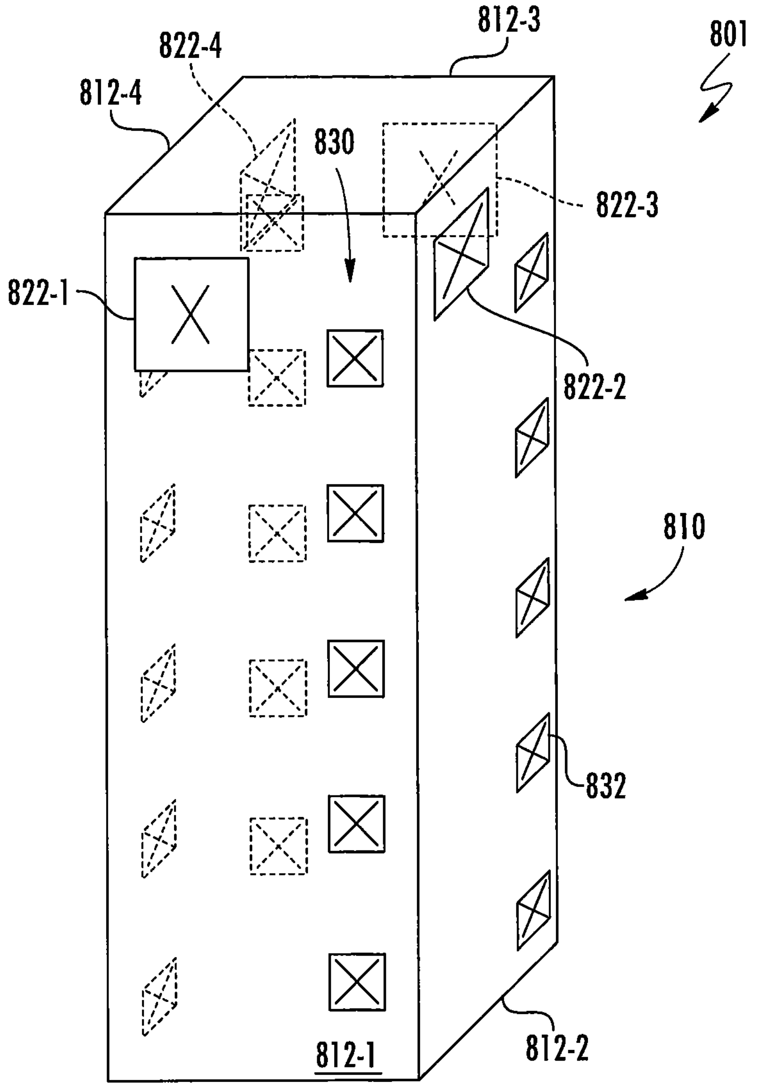
FIGS. 17A and 17B are schematic diagrams illustrating small cell base station antennas according to additional embodiments of the present invention.

FIG. 17A schematically illustrates another small cell base station antenna 801 that is similar to the small cell base station antenna 800 of FIG. 16A. The primary difference between small cell base station antenna 800 and small cell base station antenna 801 is that low band radiating elements 822-1 through 822-4 have been moved from backplanes 812-1 and 812-3, respectively, to backplanes 812-2 and 812-4, and moved from the lower portions of the backplanes 812 to the upper portions thereof. The small cell base station antenna 801 will once again create two generally peanut-shaped antenna beams at each of the +45° and −45° polarizations, and hence will support four port operation. The pointing directions of two of these antenna beams will differ, however, due to the relocation of low band radiating elements 822-2 and 822-4 from backplanes 812-1 and 812-3, respectively, to backplanes 812-2 and 812-4. The small cell base station antenna 801 may be connected to a four port radio 842 in the manner shown in FIG. 16B.

Figure 17B:
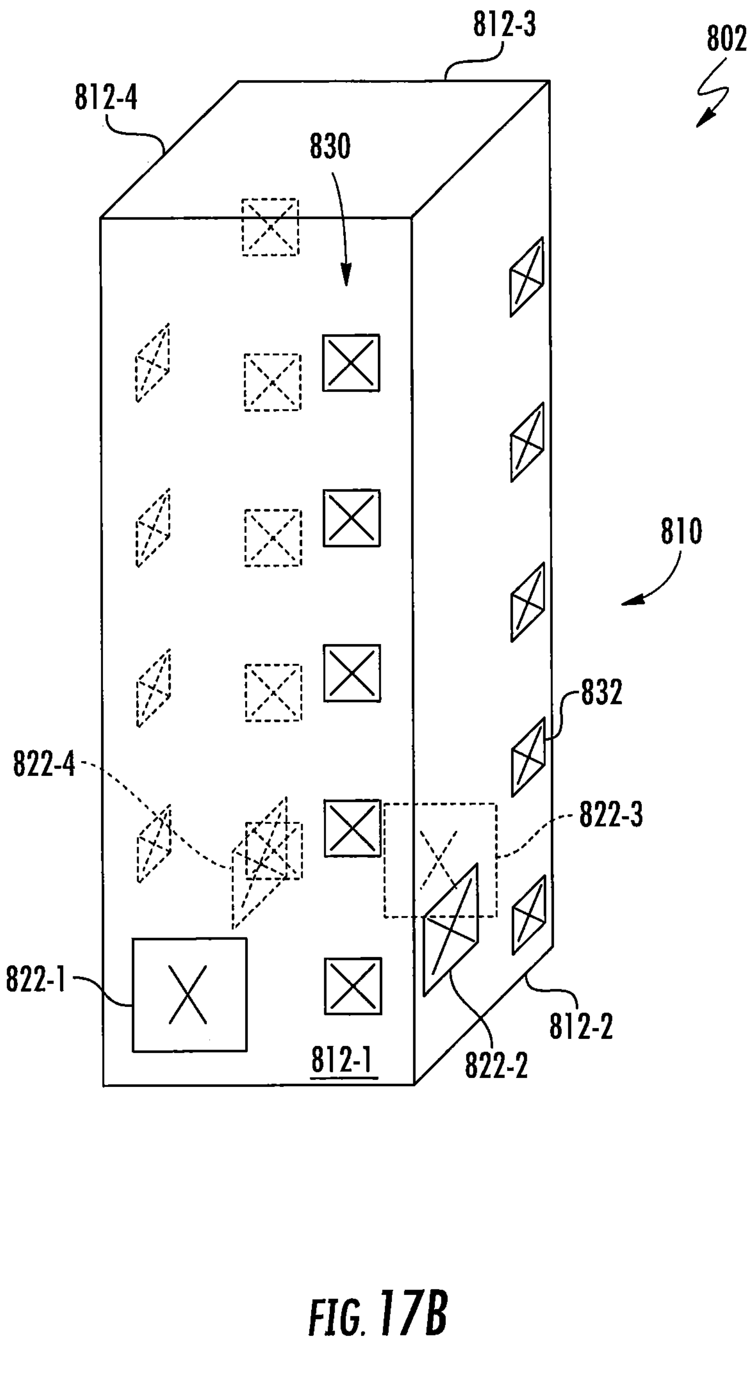

FIG. 17B schematically illustrates another small cell base station antenna 802 that is similar to the small cell base station antenna 801 of FIG. 17A. The primary difference between small cell base station antenna 801 and small cell base station antenna 802 is that low band radiating elements 822-2 and 822-4 have been moved from the upper portions of backplanes 812-2 and 812-4 to the lower portions thereof. Like small cell base station antenna 801, small cell base station antenna 802 will create two generally peanut-shaped antenna beams in each of the +45° and −45° polarizations, and hence will support four port operation. The small cell base station antenna 802 may also be connected to a four port radio 842 in the manner shown in FIG. 16B.

Figure 18:
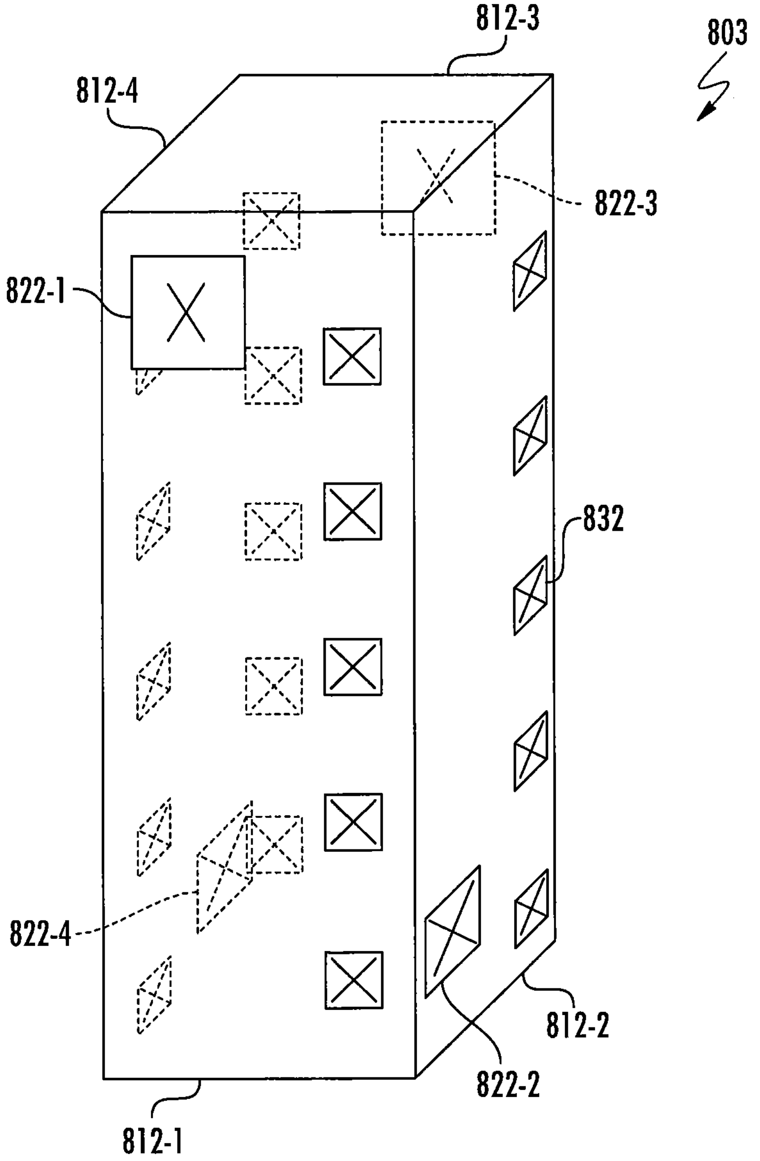
FIGS. 18 and 19 are schematic diagrams illustrating small cell base station antennas according to yet additional embodiments of the present invention.

FIG. 18 schematically illustrates another small cell base station antenna 803 that is similar to the small cell base station antennas 801 and 802 of FIGS. 17A-17B. The primary difference between small cell base station antenna 803 and small cell base station antennas 801 and 802 is that the low band radiating elements 822-2 and 822-4 that are mounted on backplanes 812-2 and 812-4 are vertically separated from the low band radiating elements 822-1 and 822-3 that are mounted on backplanes 812-1 and 812-3. In particular, low band radiating elements 822-2 and 822-4 are mounted on the lower portions of backplanes 812-2 and 812-4, respectively, while low band radiating elements 822-1 and 822-3 are mounted on the upper portions of backplanes 812-2 and 812-4, respectively. It will be appreciated that in other embodiments low band radiating elements 822-2 and 822-4 may be mounted on the upper portions of backplanes 812-2 and 812-4, respectively, and low band radiating elements 822-1 and 822-3 may be mounted on the lower portions of backplanes 812-2 and 812-4, respectively. Like small cell base station antennas 801 and 802, small cell base station antenna 803 will create two generally peanut-shaped antenna beams in each of the +45° and −45° polarizations, and hence will support four port operation. The small cell base station antenna 803 may also be connected to a four port radio 842 in the manner shown in FIG. 16B.

FIG. 10 illustrates a small cell base station antenna 400, which has previously been described. The small cell base station antenna 400 is similar to the above-described small cell base station antennas 800-803. The small cell base station antenna 400 differs from small cell base station antennas 800-803 in that the small cell base station antenna 400 includes two low band radiating elements 822 per low band linear array 820 instead of one low band radiating element 822. By providing two low band radiating elements 822 per linear array 820 the antenna gain in the low band may be enhanced and the elevation beamwidth reduced.

Figure 19:
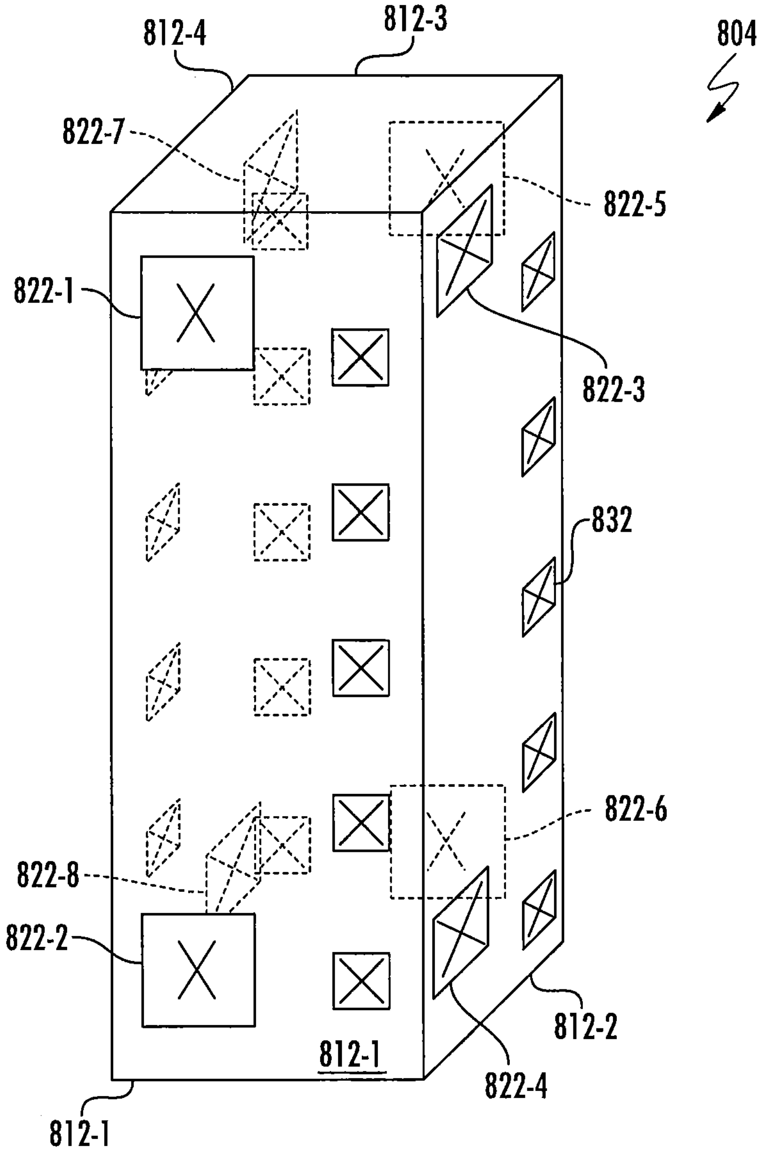

FIG. 19 schematically illustrates another small cell base station antenna 804 according to embodiments of the present invention. The small cell base station antenna 804 mounts the low band radiating elements 822 in the same locations as the small cell base station antenna 400 of FIG. 10, but uses a different approach for feeding these low band radiating elements 822. In particular, low band radiating elements 822-1 and 822-4 form a first array and low band radiating elements 822-5 and 822-8 form a second array. These first and second arrays 820 are commonly fed by a first radio port having a +45° polarization and by a second radio port having a −45° polarization to form first and second oppositely polarized antenna patterns. Low band radiating elements 822-3 and 822-6 form a third array and low band radiating elements 822-7 and 822-2 form a fourth array. The third and fourth arrays are commonly fed by a third radio port having a +45° polarization and by a fourth radio port having a −45° polarization to form third and fourth oppositely polarized antenna patterns. These antenna beams will have a quasi-omnidirectional pattern shape.

In some cases, the isolation between the low band radiating elements 822 that form different antenna beams may be an important performance parameter. The level of isolation will depend on, among other things, the physical separation between the low band radiating elements 822 that are used to form different antenna beams. In the above-described embodiments, it can be seen that either or both horizontal and vertical separation may be used. It is believed in in some cases vertical separation may be more effective at achieving isolation than horizontal separation, particularly in cases where the base station antenna is elongate in the vertical direction. Thus, for example, in some applications the small cell base station antenna 800 of FIG. 16A may exhibit enhanced isolation as compared to the small cell base station antennas 802 and 803 of FIGS. 17A-17B. The small cell base station antenna 804 of FIG. 18 may exhibit even better isolation as it physically separates the low band radiating elements 822 that form different antenna beams in both the horizontal and vertical directions.

As discussed above with reference to FIGS. 13A-14B, out-of-phase feeding may be used where the phase of the sub-components of an RF signal that are fed to different arrays of radiating elements are made to be out-of-phase with each other. As described above, this approach may broaden the antenna pattern. In specific embodiments, out-of-phase feeding may be used to make peanut-shaped antenna pattern more omnidirectional in nature.

It will be appreciated that any of the small cell base station antennas disclosed herein, specifically including the antennas of FIGS. 16A-19, may be fed using in-phase feeding or out-of-phase feeding. When out-of-phase feeding is used, anti-phase feeding may be used or any other amount of phase difference may be used.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

What is claimed is:

1. A base station antenna, comprising:

a first array of first frequency band radiating elements that are mounted to extend outwardly from a first backplane;

a second array of first frequency band radiating elements that are mounted to extend outwardly from a second backplane;

a third array of first frequency band radiating elements that are mounted to extend outwardly from a third backplane;

a fourth array of first frequency band radiating elements that are mounted to extend outwardly from a fourth backplane;

a fifth array of second frequency band radiating elements that are mounted to extend outwardly from the first backplane; and a sixth array of second frequency band radiating elements that are mounted to extend outwardly from the third backplane, wherein the first array of first frequency band radiating elements is positioned opposite the third array of first frequency band radiating elements, and the second array of first frequency band radiating elements is positioned opposite the fourth array of first frequency band radiating elements, and wherein the fifth and sixth arrays of second frequency band radiating elements are the only second frequency band radiating elements included in the base station antenna.

2. The base station antenna of claim 1, wherein the fifth array of second frequency band radiating elements is fed out-of-phase with respect to the sixth array of second frequency band radiating elements.

3. The base station antenna of claim 1, further comprising:

a first radio frequency ("RF") port;

a first feed network that couples the first RF port to the first and third arrays of first frequency band radiating elements;

a second RF port; and a second feed network that couples the second RF port to the second and fourth arrays of first frequency band radiating elements.

4. The base station antenna of claim 3, further comprising:

a third RF port;

a third feed network that couples the third RF port to the fifth and sixth arrays of second frequency band radiating elements.

5. The base station antenna of claim 1, wherein the first and third arrays of first frequency band radiating elements are configured to generate a first antenna beam that has a peanut-shaped cross-section in the azimuth plane, and the second and fourth arrays of first frequency band radiating elements are configured to generate a second antenna beam that has a peanut-shaped cross-section in the azimuth plane.

6. The base station antenna of claim 1, wherein the second frequency band encompasses lower frequencies than the first frequency band.

7. A base station antenna, comprising:

a first radio frequency ("RF") port;

a second RF port;

a first array of radiating elements that is mounted to extend outwardly from a first backplane;

a second array of radiating elements that is mounted to extend outwardly from a second backplane;

a third array of radiating elements that is mounted to extend outwardly from a third backplane;

a fourth array of radiating elements that is mounted to extend outwardly from a fourth backplane, wherein the first array of radiating elements is positioned opposite the third array of radiating elements, wherein the second array of radiating elements is positioned opposite the fourth array of radiating elements, wherein the first and third arrays of radiating elements are configured to generate a first antenna beam that has a first peanut-shaped cross-section in an azimuth plane in response to a first RF signal received from the first radio port, and wherein the second and fourth arrays of radiating elements are configured to generate a second antenna beam that has a second peanut-shaped cross-section in an azimuth plane in response to a second RF signal received from the second radio port, and wherein the first RF port is not coupled to the second and fourth arrays of radiating elements and the second RF port is not coupled to the first and third arrays of radiating elements, and wherein the base station antenna is a base station antenna for a cellular communications system.

8. The base station antenna of claim 7, wherein a longitudinal axis of the first antenna beam in the azimuth plane is rotated ninety degrees from a longitudinal axis of the second antenna beam in the azimuth plane.

9. The base station antenna of claim 7, wherein the first through fourth backplanes form a tubular reflector assembly having a rectangular cross-section in the azimuth plane.

10. The base station antenna of claim 7, wherein the first and second antenna beams together provide omni-directional coverage in the azimuth plane.

11. The base station antenna of claim 7, further comprising:

a first adjustable phase shifter coupled between the first RF port and the first array of radiating elements;

a second adjustable phase shifter coupled between the first RF port and the third array of radiating elements;

a third adjustable phase shifter coupled between the second RF port and the second array of radiating elements; and a fourth adjustable phase shifter coupled between the second RF port and the fourth array of radiating elements.

12. A base station antenna, comprising:

a first array of first frequency band radiating elements that are mounted to extend outwardly from a first backplane;

a second array of first frequency band radiating elements that are mounted to extend outwardly from a second backplane;

a third array of first frequency band radiating elements that are mounted to extend outwardly from a third backplane;

a fourth array of first frequency band radiating elements that are mounted to extend outwardly from a fourth backplane;

a fifth array of second frequency band radiating elements that are mounted to extend outwardly from the first backplane; and a sixth array of second frequency band radiating elements that are mounted to extend outwardly from the third backplane, wherein the first array of first frequency band radiating elements is positioned opposite the third array of first frequency band radiating elements, and the second array of first frequency band radiating elements is positioned opposite the fourth array of first frequency band radiating elements, and wherein no second frequency band radiating elements are mounted to extend outwardly from the second backplane or from the fourth backplane.

13. The base station antenna of claim 12, wherein the fifth array of second frequency band radiating elements is fed out-of-phase with respect to the sixth array of second frequency band radiating elements.

14. The base station antenna of claim 12, wherein the first and third arrays of first frequency band radiating elements are configured to generate a first antenna beam that has a peanut-shaped cross-section in the azimuth plane, and the second and fourth arrays of first frequency band radiating elements are configured to generate a second antenna beam that has a peanut-shaped cross-section in the azimuth plane.

15. The base station antenna of claim 1, wherein the second frequency band encompasses lower frequencies than the first frequency band.

* * * * *